(12) United States Patent
Harwell et al.

(10) Patent No.: US 9,967,607 B2
(45) Date of Patent: May 8, 2018

(54) RECORDING AND PUBLISHING CONTENT ON SOCIAL MEDIA WEBSITES

(71) Applicant: Youtoo Technologies, LLC, Irving, TX (US)

(72) Inventors: Mark A. Harwell, Plano, TX (US); Christopher W. Wyatt, Dallas, TX (US); Ryland M. Reed, North Richland Hills, TX (US)

(73) Assignee: YouToo Technologies, LLC, Irving, TX (US)

( * ) Notice: Subject to any disclaimer, the term of this patent is extended or adjusted under 35 U.S.C. 154(b) by 0 days. days.

(21) Appl. No.: 14/798,232

(22) Filed: Jul. 13, 2015

(65) Prior Publication Data

US 2016/0191974 A1    Jun. 30, 2016

Related U.S. Application Data

(63) Continuation of application No. 13/674,768, filed on Nov. 12, 2012, now Pat. No. 9,083,997, which is a
(Continued)

(51) Int. Cl.
*H04N 5/765* (2006.01)
*H04N 9/80* (2006.01)
(Continued)

(52) U.S. Cl.
CPC ..... *H04N 21/2743* (2013.01); *H04N 21/2408* (2013.01); *H04N 21/4223* (2013.01);
(Continued)

(58) Field of Classification Search
CPC ........... H04N 21/2743; H04N 21/2408; H04N 21/4223; H04N 21/4782; H04N 21/4788; H04N 21/437; H04N 21/6175
(Continued)

(56) References Cited

U.S. PATENT DOCUMENTS

| 5,488,433 A | 1/1996 | Washino et al. |
| 5,982,425 A | 11/1999 | Allen et al. |

(Continued)

FOREIGN PATENT DOCUMENTS

| CN | 101945096 B | 1/2013 |
| WO | 0180039 A2 | 10/2001 |

OTHER PUBLICATIONS

Communication pursuant to Article 94(3) received in European Patent Application No. 13167164.6 on Dec. 4, 2013, 8 pages.
(Continued)

*Primary Examiner* — Robert Chevalier
(74) *Attorney, Agent, or Firm* — Grable Martin Fulton PLLC

(57) ABSTRACT

Methods, systems, and apparatus, including computer programs encoded on a computer storage medium, for recording and publishing content on social networking websites and other websites include providing an imbedded link on a social networking webpage to media recorder software stored on an external server system, invoking the media recorder software within a displayed instance of the social networking webpage through an application programming interface for the social networking webpage, receiving a video stream defining video captured using the media recorder software at the external video management server system, generating and storing a video file using the received video stream at the external server system, selecting the stored video file for distribution via one or more communication networks, and providing the stored video file for display within displayed instances of webpages hosted on external web server systems.

38 Claims, 6 Drawing Sheets

Related U.S. Application Data continuation of application No. 13/475,765, filed on May 18, 2012, now Pat. No. 8,311,382.

(60) Provisional application No. 61/644,909, filed on May 9, 2012.

(51) Int. Cl.
    *H04N 21/2743* (2011.01)
    *H04N 21/24* (2011.01)
    *H04N 21/4223* (2011.01)
    *H04N 21/4782* (2011.01)
    *H04N 21/437* (2011.01)
    *H04N 21/4788* (2011.01)
    *H04N 21/61* (2011.01)

(52) U.S. Cl.
    CPC ....... *H04N 21/437* (2013.01); *H04N 21/4782* (2013.01); *H04N 21/4788* (2013.01); *H04N 21/6175* (2013.01)

(58) Field of Classification Search
    USPC ............... 386/200, 224, 248, 291, 326, 299
    See application file for complete search history.

(56) References Cited

U.S. PATENT DOCUMENTS

| | | |
|---|---|---|
| 6,229,850 B1 | 5/2001 | Linzer et al. |
| 6,487,721 B1 | 11/2002 | Safadi |
| 6,584,450 B1 | 6/2003 | Hastings et al. |
| 6,697,103 B1 | 2/2004 | Fernandez et al. |
| 6,757,482 B1 | 6/2004 | Ochiai et al. |
| 6,774,926 B1 | 8/2004 | Ellis et al. |
| 6,918,131 B1 | 7/2005 | Rautila et al. |
| 6,941,515 B1 | 9/2005 | Wilkins |
| 7,302,696 B1 | 11/2007 | Yamamoto |
| 7,562,300 B1 | 7/2009 | Tobias et al. |
| 7,649,937 B2 | 1/2010 | Rabenold et al. |
| 7,769,819 B2 | 8/2010 | Lerman et al. |
| 7,774,819 B2 | 8/2010 | Perez |
| 7,904,490 B2 | 3/2011 | Ogikubo |
| 8,051,447 B2 | 11/2011 | Stallings et al. |
| 8,150,464 B2 | 4/2012 | Dey |
| 8,189,945 B2 | 5/2012 | Stojancic et al. |
| 8,266,667 B2 | 9/2012 | O'Donnell et al. |
| 8,311,382 B1 | 11/2012 | Harwell et al. |
| 8,359,616 B2 | 1/2013 | Rosenberg et al. |
| 8,464,304 B2 | 6/2013 | Harwell et al. |
| 8,490,206 B1 | 7/2013 | Fish |
| 8,601,506 B2 | 12/2013 | Harwell et al. |
| 8,819,719 B1 | 8/2014 | Chen et al. |
| 9,083,997 B2 | 7/2015 | Harwell et al. |
| 2001/0004743 A1 | 6/2001 | Krueger et al. |
| 2002/0056119 A1 | 5/2002 | Moynihan |
| 2002/0056123 A1 | 5/2002 | Liwerant et al. |
| 2002/0104099 A1 | 8/2002 | Novak |
| 2002/0112005 A1 | 8/2002 | Namias |
| 2002/0120930 A1 | 8/2002 | Yona |
| 2004/0008249 A1 | 1/2004 | Nelson et al. |
| 2004/0078825 A1 | 4/2004 | Murphy |
| 2004/0117786 A1 | 6/2004 | Kellerman et al. |
| 2006/0048186 A1 | 3/2006 | Alterman |
| 2006/0074752 A1 | 4/2006 | Newmark |
| 2006/0242678 A1* | 10/2006 | Kostadinovich ......... H04N 5/76 725/105 |
| 2006/0259589 A1 | 11/2006 | Lerman et al. |
| 2006/0271977 A1 | 11/2006 | Lerman et al. |
| 2006/0294538 A1 | 12/2006 | Li et al. |
| 2007/0033612 A1 | 2/2007 | Lerman et al. |
| 2007/0133034 A1 | 6/2007 | Jindal et al. |
| 2007/0162487 A1 | 7/2007 | Frailey |
| 2007/0203911 A1 | 8/2007 | Chiu |
| 2007/0206606 A1* | 9/2007 | Coleman ............ G06Q 30/02 370/395.52 |
| 2007/0214180 A1 | 9/2007 | Crawford |
| 2007/0226053 A1 | 9/2007 | Carl et al. |
| 2007/0245388 A1 | 10/2007 | Shen |
| 2007/0291747 A1 | 12/2007 | Stern et al. |
| 2007/0300271 A1 | 12/2007 | Allen et al. |
| 2008/0143875 A1 | 6/2008 | Scott et al. |
| 2008/0209451 A1 | 8/2008 | Michels et al. |
| 2008/0235200 A1* | 9/2008 | Washington ............ G06F 21/10 |
| 2008/0243692 A1 | 10/2008 | Trimper et al. |
| 2008/0260348 A1* | 10/2008 | Maeda ................ G11B 27/034 386/279 |
| 2008/0263589 A1 | 10/2008 | Jacobson et al. |
| 2008/0270569 A1 | 10/2008 | McBride et al. |
| 2009/0012961 A1 | 1/2009 | Bramson et al. |
| 2009/0012965 A1 | 1/2009 | Franken |
| 2009/0037605 A1 | 2/2009 | Li |
| 2009/0064250 A1 | 3/2009 | Nakata |
| 2009/0070675 A1 | 3/2009 | Li |
| 2009/0094652 A1 | 4/2009 | Adham et al. |
| 2009/0199234 A1 | 8/2009 | Mukerji et al. |
| 2009/0204885 A1 | 8/2009 | Ellsworth et al. |
| 2009/0207316 A1 | 8/2009 | Cupal et al. |
| 2010/0037138 A1 | 2/2010 | Shcherbakov et al. |
| 2010/0066804 A1 | 3/2010 | Shoemake et al. |
| 2010/0081116 A1 | 4/2010 | Barasch et al. |
| 2010/0125795 A1 | 5/2010 | Yu et al. |
| 2010/0180330 A1 | 7/2010 | Zhu et al. |
| 2010/0205562 A1 | 8/2010 | Heer |
| 2010/0241623 A1 | 9/2010 | Acker et al. |
| 2010/0274696 A1 | 10/2010 | Krietzman et al. |
| 2010/0274847 A1 | 10/2010 | Anderson et al. |
| 2010/0293580 A1 | 11/2010 | Latchman |
| 2010/0306815 A1 | 12/2010 | Emerson et al. |
| 2011/0030031 A1 | 2/2011 | Lussier et al. |
| 2011/0037864 A1 | 2/2011 | Cao |
| 2011/0055347 A1 | 3/2011 | Hu et al. |
| 2011/0076993 A1 | 3/2011 | Stephens |
| 2011/0113454 A1 | 5/2011 | Newell et al. |
| 2011/0145070 A1 | 6/2011 | Wolinsky et al. |
| 2011/0154200 A1 | 6/2011 | Davis et al. |
| 2011/0188836 A1 | 8/2011 | Popkiewicz et al. |
| 2011/0191163 A1 | 8/2011 | Allaire et al. |
| 2012/0041759 A1 | 2/2012 | Barker et al. |
| 2012/0189282 A1 | 7/2012 | Wyatt et al. |
| 2012/0192215 A1 | 7/2012 | Wyatt et al. |
| 2012/0192220 A1 | 7/2012 | Wyatt et al. |
| 2012/0192225 A1 | 7/2012 | Harwell et al. |
| 2012/0192239 A1 | 7/2012 | Harwell et al. |
| 2012/0254925 A1 | 10/2012 | Nassiri |
| 2012/0297423 A1 | 11/2012 | Kanojia et al. |
| 2012/0304230 A1 | 11/2012 | Harwell et al. |
| 2012/0304237 A1 | 11/2012 | Harwell et al. |

OTHER PUBLICATIONS

Extended European Search Report issued in European Patent Application No. 13167164.6-1905 on Aug. 8, 2013, 9 pages.

International Search Report and Written Opinion received in corresponding Patent Cooperation Treaty Application No. PCT/US2012/022353, dated Aug. 2, 2013, 14 pages.

International Search Report and Written Opinion received in corresponding Patent Cooperation Treaty Application No. PCT/US2013/040264, dated Aug. 8, 2013, 12 pages.

International Search Report and Written Opinion received in corresponding Patent Cooperation Treaty Application No. PCT/US2012/022355, dated Apr. 9, 2012, 12 pages.

International Search Report and Written Opinion received in corresponding Patent Cooperation Treaty Application No. PCT/US2012/022246, dated Mar. 21, 2012, 12 pages.

Marshall, Mall, "TwitVid.io Strikes Back—Lets You Tweet Directly from Webcam," http://venturebeat.com/2009/05/23/twitvidio-strikes-back-lets-you-tweet-from-directly-from-webcam/, May 23, 2009, 5 pages.

Caceres, Chris, "Vidly Betting on Mobile Video," http://vatortvinews/2009-11-12-vidly-betting-on-mobile-video, Nov. 12, 2009, 2 pages.

(56) References Cited

OTHER PUBLICATIONS

Twitvid.io, "Welcome to TwitVid! The Easiest Way to Share Videos on Twitter," https://web.archive.org/web/20090813224128/http://twitvid.io//, printed on Jan. 25, 2017, 1 page.
Vidly Blog, "You Can Now Share HD Videos on Twitter," https://web.archive.org/web/20091113052403/http:/blog.vidly.com/, Nov. 10, 2009, 1 page.
Vidly Blog, "Multiple Embed Sizes Now Available," https://web.archive.org/web/20090914132126/http/blog.vidly.com/multiple-embed-sizes-now-available, Sep. 11, 2009, 1 page.
Vidly Blog, "Auto-Post Your Videos to Facebook and YouTube and a Fresh New Look," http://web.archive.org/web/20100510160603/http://blog.vidly.com/, Dec. 15, 2009, 2 pages.
Vidly Blog, "Vidly for the iPhone Hits the App Store (finally)! Get it While It's Hot," http://web.archive.org/web/20091113052403/http:/blog.vidly.com/, Nov. 2, 2009, 1 page.
Vidly Blog, "RSS Feed for Your Videos and Video Flagging are Live!," http://web.archive.org/web/20091113052403/http:/blog.vidly.com/, Sep. 11, 2009, 1 page.
CNN Politics, "Schwarzenegger Wields Knife, Talks Budget Cuts in Video," http://politicalticker.blogs.cnn.com/2009/07/23/schwarzenegger-wields-knife-talks-budget-cuts-in-video/, Jul. 23, 2009, 2 pages.
Siegler, MG, "Vidly Brings HD Video to Twitter," Tech Crunch, https://techcrunch.com/2009/11/10/vidly-brings-hd-video-to-twitted, Nov. 10, 2009, 2 pages.
Twitvid, "Upload and Tweet a Video," https://web.archive.org/web/20091220033554/http://www.twitvid.com/index.php? area=upload, printed on Jan. 25, 2017, 1 page.
Twitvid Blog, "New TwitterFon !Phone App with TwitVid Video Tweeting is Now Available," https://web.archive.org/web/20090901191259/http://twitvid.posterous.com/, Jul. 27, 2009, 1 page.
Twidvid Blog, "TwitVid Android App Now Available," https://web.archive.org/web/20100422194815/http://twitvid.posterous.com, Apr. 19, 2010, 1 page.
Twitvid Blog, "TwitVid Now on the Blackberry," https://web.archive.org/web/20100511170939/http://twitvid.posterous.com/, Aug. 19, 2009, 1 page.
Apple iPhone School, "TwitVid-Post Video Taken From Your iPhone to Twitter," http://www.appleiphoneschool.com/2009/07/11/, Jul. 11, 2009, 5 pages.
Lowensohn, Josh, "TwitVid App Lets You Send iPhone Videos to Twitter," CNET, Tech Culture, https://www.cnet.com/news/twitvid-app-lets-you-send-iphone-videos-to-twitter/, Jul. 13, 2009, 1 page.
Stone Design, "Twittelator Free / Twittelator Pro / Twittelator Pad," https://web.archive.org/web/20100528130849/http://stone.com/Twittelator/, printed on Jan. 25, 2017, 1 page.
Stone Design, "Twittelator Pro News," https://web.archive.org/web/20100102050151/https://stone.com/Twittelator/Twittelator_News.html, Dec. 22, 2009, 13 pages.
Stone Design, "Twittelator Screens," https://web.archive.org/web/20100106015548/http://www.stone.com/twittelator/twittelator_screens.html, printed on Jan. 25, 2017, 10 pages.
Stone Design, "Twittelator v 3.8 Help," https://web.archive.org/web/20100523202138/http://www.stone.com/twiftelator/help/index.html, printed Jan. 25, 2017, 45 pages.
VideoGenie, "The VideoGenie Solution," https://web.archive.org/web/20100620083420/http://www.videogenie.com, printed on Jan. 25, 2017, 1 page.
Stanford Graduate School of Business, "Cool Product Expo: Video Genie," You Tube, https://www.youtube.com/watch?v=E-Xcx1fxEDU, May 28, 2010, 1 page.
Nassiri, Justin, Standford Graduate School of Business,"VideoGenie.wmv", You Tube, https://www.youtube.com/ watch?v=D9gdKKHRgug, Mar. 26, 2010, 1 page.
VideoGenie, "Broadcast Your Fans Across the Web," http://web.archive.org/web/20110429013716/http://videogenie.com/, printed on Jan. 25, 2017, 2 pages.
Nassiri, Justin, "Video Genie Demo," https://www.youtube.com/watch?v=lyxCTf-SAtl, May 27, 2010, 1 page.
Twitvid, "Frequently Asked Questions," https://web.archive.org/web/20090527122131/http://twitvid.io/faq, printed on Jan. 26, 2017, 1 page.
Lahti, Janne, et al., "Context-Aware Mobile Capture and Sharing of Video Clips," Handbook of Research on Mobile Multimedia, May 2006 (excerpts included in Exhibit B of the Invalidity Contentions).
Lahti, Janne, et al., "Context-Aware Mobile Capture and Sharing of Video Clips," Handbook of Research on Mobile Multimedia, May 2006, pp. 340-356.
"Defendant's Preliminary Invalidity Contentions", *Youtoo Technologies, LLC* v. *Twitter, Inc.*, Case No. 3:16-cv-00764-N, dated Oct. 18, 2016, 43 pages.
Exhibit A, "U.S. Patent Publication 2006/0259589 to Lerman et al., "Browser Enabled Video Manipulation"", Exhibit ncluded in Defendant Preliminary Invalidity Contentions, dated Oct. 28, 2016, 56 pages.
Exhibit B, "Context-Aware Mobile Capture and Sharing of Video Clips", Exhibit included in Defendant Preliminary Invalidity Contentions, dated Oct. 28, 2016, 39 pages.
Exhibit C, "U.S. Pat. No. 8,819,719 to Chen et al., " Real-Time Video Commenting"", Exhibit included in Defendant Preliminary Invalidity Contentions, dated Oct. 28, 2016, 42 pages.
Exhibit D, "U.S. Patent Publication 2009/0204885 to Ellsworth et al., "Automated Management and Publication of Electronic Content from Mobile Nodes"", Exhibit included in Defendant Preliminary Invalidity Contentions, dated Oct. 28, 2016, 38 pages.
Exhibit E, "U.S. Patent Publication 2006/0242678 to Kostadinovich, "Remote Network Video Content Recorder System"", Exhibit included in Defendant Preliminary Invalidity Contentions, dated Oct. 28, 2016, 38 pages.
Exhibit F, "U.S. Patent Publication 2007/0203911 to Chiu, "Video Weblog"", Exhibit included in Defendant Preliminary Invalidity Contentions, dated Oct. 28, 2016, 70 pages.
Exhibit G, "China SIPO Patent Publication CN 101945096 to Dong et al., "System for Mobile Phone Video Live Broadcasting Towards Set-Top Box or PC and Method Thereof"", Exhibit included in Defendant Preliminary Invalidity contentions, dated Oct. 28, 2016, 34 pages.
Exhibit H, "U.S. Patent Publication 2002/0056123 to Liwerant et al., "Sharing a Streaming Video"", Exhibit included in Defendant Preliminary Invalidity Contentions, dated Oct. 28, 2016, 49 pages.
Exhibit I, "Twitvid.io System", Exhibit included in Defendant Preliminary Invalidity Contentions, dated Oct. 28, 2016, 13 pages.
Exhibit J, "Twitvid.com System", Exhibit included in Defendant Preliminary Invalidity Contentions, dated Oct. 28, 2016, 34 pages.
Exhibit K, "Twittelator System", Exhibit included in Defendant Preliminary Invalidity Contentions, dated Oct. 28, 2016, 24 pages.
Exhibit L, "VideoGenie System", Exhibit included in Defendant Preliminary Invalidity Contentions, dated Oct. 28, 2016, 26 pages.
Exhibit M, "U.S. Patent Publication 2007/0226053 to Carl et al., "System for Uploading Video Advertisements, Solicit User Feedback, and Create Ratings/Rankings"", Exhibit included in Defendant Preliminary Invalidity Contentions, dated Oct. 28, 2016, 13 pages.
Exhibit N, "U.S. Patent Publication 2009/0207316 to Cupal et al., "Methods for Summarizing and Auditing the Content of Digital Video"", Exhibit included in Defendant Preliminary Invalidity Contentions, dated Oct. 28, 2016, 14 pages.
Exhibit O, "U.S. Patent Publication 2008/0235200 to Washington et al., "System and Method for Identifying Content"", Exhibit included in Defendant Preliminary Invalidity Contentions, dated Oct. 28, 2016, 7 pages.
Exhibit P, U.S. "Patent Publication US2006/0048186 to Alterman, "Method and Apparatus for Storing and Accessing Videos From a Remote Location"", Exhibit included in Defendant Preliminary Invalidity Contentions, dated Oct. 28, 2016, 47 pages.
Exhibit Q, "U.S. Patent Publication 2006/0242678 to Kostadinovich, "Remote Network Video Content Recorder System"", Exhibit included in Defendant Preliminary Invalidity Contentions, dated Oct. 28, 2016, 30 pages.

(56) References Cited

OTHER PUBLICATIONS

Exhibit R, "U.S. Patent Publication 2007/0203911 to Chiu, "Video Weblog"", Exhibit included in Defendant Preliminary Invalidity Contentions, dated Oct. 28, 2016, 43 pages.
Exhibit S, "Twitvid.io System", Exhibit included in Defendant Preliminary Invalidity Contentions, dated Oct. 28, 2016, 33 pages.
Exhibit T, "Twitvid.com System", Exhibit included in Defendant Preliminary Invalidity Contentions, dated Oct. 28, 2016, 27 pages.
Exhibit U, "Twittelator System", Exhibit included in Defendant Preliminary Invalidity Contentions, dated Oct. 28, 2016, 18 pages.
Exhibit V, "VideoGenie System", Exhibit included in Defendant Preliminary Invalidity Contentions, dated Oct. 28, 2016, 20 pages.
Exhibit W, "U.S. Patent Publication 200610259588 to Lerman et al., "Browser Enabled Video Manipulation"", Exhibit ncluded in Defendant Preliminary Invalidity Contentions, dated Oct. 28, 2016, 53 pages.
Exhibit X, "Context-Aware Mobile Capture and Sharing of Video Clips", Exhibit included in Defendant Preliminary Invalidity Contentions, dated Oct. 28, 2016, 23 pages.
Exhibit Y, "U.S. Pat. No. 8,819,719 to Chen et al., "Real-Time Video Commenting"", Exhibit included in Defendant Preliminary Invalidity Contentions, dated Oct. 28, 2016, 30 pages.
Exhibit Z, "U.S. Patent Publication 2009/0204885 to Ellsworth et al., "Automated Management and Publication of Electronic Content from Mobile Nodes"", Exhibit included in Defendant Preliminary Invalidity Contentions, dated Oct. 28, 2016, 24 pages.
Exhibit AA, "China SIPO Patent Publication CN 101945096 to Dong et al., "System for Mobile Phone Video Live Broadcasting Towards Set-Top Box or PC and Method Thereof"", Exhibit included in Defendant Preliminary Invalidity Contentions, dated Oct. 28, 2016, 25 pages.
Exhibit BB, "U.S. Patent Publication 2002/0056123 to Liwerant et al., "Sharing a Streaming Video"", Exhibit included in Defendant Preliminary Invalidity Contentions, dated Oct. 28, 2016, 48 pages.
Exhibit CC, "U.S. Patent Publication 2006/0259588 to Lerman et al., "Browser Enabled Video Manipulation"", Exhibit included in Defendant Preliminary Invalidity Contentions, dated Oct. 28, 2016, 48 pages.
Exhibit DD, "U.S. Publication No. 2012/0254925 to Nassiri, "Computer Systems and Methods for Video Capturing Managing, and/or Sharing"", Exhibit included in Defendant Preliminary Invalidity Contentions, dated Oct. 28, 2016, 51 pages.
Exhibit EE, "U.S. Pat. No. 8,819,719 to Chen et al., "Real-Time Video Commenting"", Exhibit included in Defendant Preliminary Invalidity Contentions, dated Oct. 28, 2016, 25 pages.
Exhibit FF, "U.S. Patent Publication 2009/0204885 to Ellsworth et al., "Automated Management and Publication of Electronic Content from Mobile Nodes"", Exhibit included in Defendant Preliminary Invalidity Contentions, dated Oct. 28, 2016, 20 pages.
Exhibit GG, "Twitvid.io System", Exhibit included in Defendant Preliminary Invalidity Contentions, dated Oct. 28, 2016, 13 pages.
Exhibit HH, "Twitvid.com System", Exhibit included in Defendant Preliminary Invalidity Contentions, dated Oct. 28, 2016, 17 pages.
Exhibit II, "VideoGenie System", Exhibit included in Defendant Preliminary Invalidity Contentions, dated Oct. 28, 2016, 15 pages.
Exhibit JJ, "U.S. Patent Publication 2007/0203911 to Chiu, "Video Weblog"", Exhibit included in Defendant Preliminary Invalidity Contentions, dated Oct. 28, 2016, 31 pages.
Decision Institution of Inter Partes Review received in Petition for Inter Partes Review of U.S. Pat. No. 9,083,997 (Case IPR2017-00829) dated Aug. 11, 2017, 25 pages.
Patent Owner Preliminary Response filed in Petition for Inter Partes Review of U.S. Pat. No. 9,083,997 (Case IPR2017-00829) filed May 24, 2017, 44 pages.
Decision Institution of Inter Partes Review received in Petition for Inter Partes Review of U.S. Pat. No. 9,083,997 (Case IPR2017-00830) dated Aug. 11, 2017, 22 pages.
Patent Owner Preliminary Response filed in Petition for Inter Partes Review of U.S. Pat. No. 9,083,997 (Case IPR2017-00830) filed May 24, 2017, 34 pages.
Petition for Inter Partes Review of U.S. Pat. No. 9,083,997 (Claims 20-35), Twitter, Inc. vs_ Youtoo Technologies, _LC, filed Jan. 31, 2017, 70 pp.
Exhibit 1007, Declaration of Dr. Kevin C. Almeroth, in support of Petition for Inter Partes Review of U.S. Pat. No. 3,083,997 (Claims 1-19), filed Jan. 31, 2017, 136 pp.
Exhibit 1007, Declaration of Dr. Kevin C. Almeroth, in support of Petition for Inter Partes Review of U.S. Pat. No. 3,083,997 (Claims 20-35), filed Jan. 31, 2017, 113 pp.
Exhibit 1008, Curriculum Vitae of Dr. Kevin C. Almeroth filed in Petition for Inter Partes Review of U.S. Pat. No. 3,083,997 (Claims 20-35) filed Jan. 31, 2017, 34 pages_.
Exhibit 1010, Bradford, et al., Excerpts from "HTML5 Mastery Semantics, Standards, and Styling," filed in Petition for Inter Partes Review of U.S. Pat. No. 9,083,997 (Claims 20-35) filed Jan. 31, 2017, 11 pp.
Exhibit 1011, 1st Declaration of Dr. Ingrid-Hsieh-Yee regarding Ex-1010, filed in Petition for Inter Partes Review of U.S. Pat. No. 9,083,997 (Claims 20-35) filed Jan. 31, 2017, 54 pages_.
Exhibit 1015, Declaration of David Bader regarding Ex-1010, filed in Petition for Inter Partes Review of U.S. Pat. No. 3,083,997 (Claims 20-35) filed Jan. 31, 2017, 4 pages_.
Exhibit 1016, Affidavit of Christopher Butler, Internet Archive regarding Ex-1010, filed in Petition for Inter Pules Review of U.S. Pat. No. 9,083,997 (Claims 20-35) filed Jan. 31, 2017, 8 pp.
Exhibit 1017, Steller, Brian, "Their Pain is His Gain," the New York Times, Aug. 22, 2010, pp. AR15 and AR19, tiled in Petition for Inter Partes Review of U.S. Pat. No. 9,083,997 (Claims 20-35) filed Jan. 31, 2017, 3 pp.
Exhibit 1018, 2nd Declaration of Dr_ Ingrid Hsieh-Yee regarding Ex-1017, filed in Petition for Inter Partes Review of U. 5_ U.S. Pat. No. 9,083,997 (Claims 20-35) filed Jan. 31, 2017, 25 pages_.

* cited by examiner

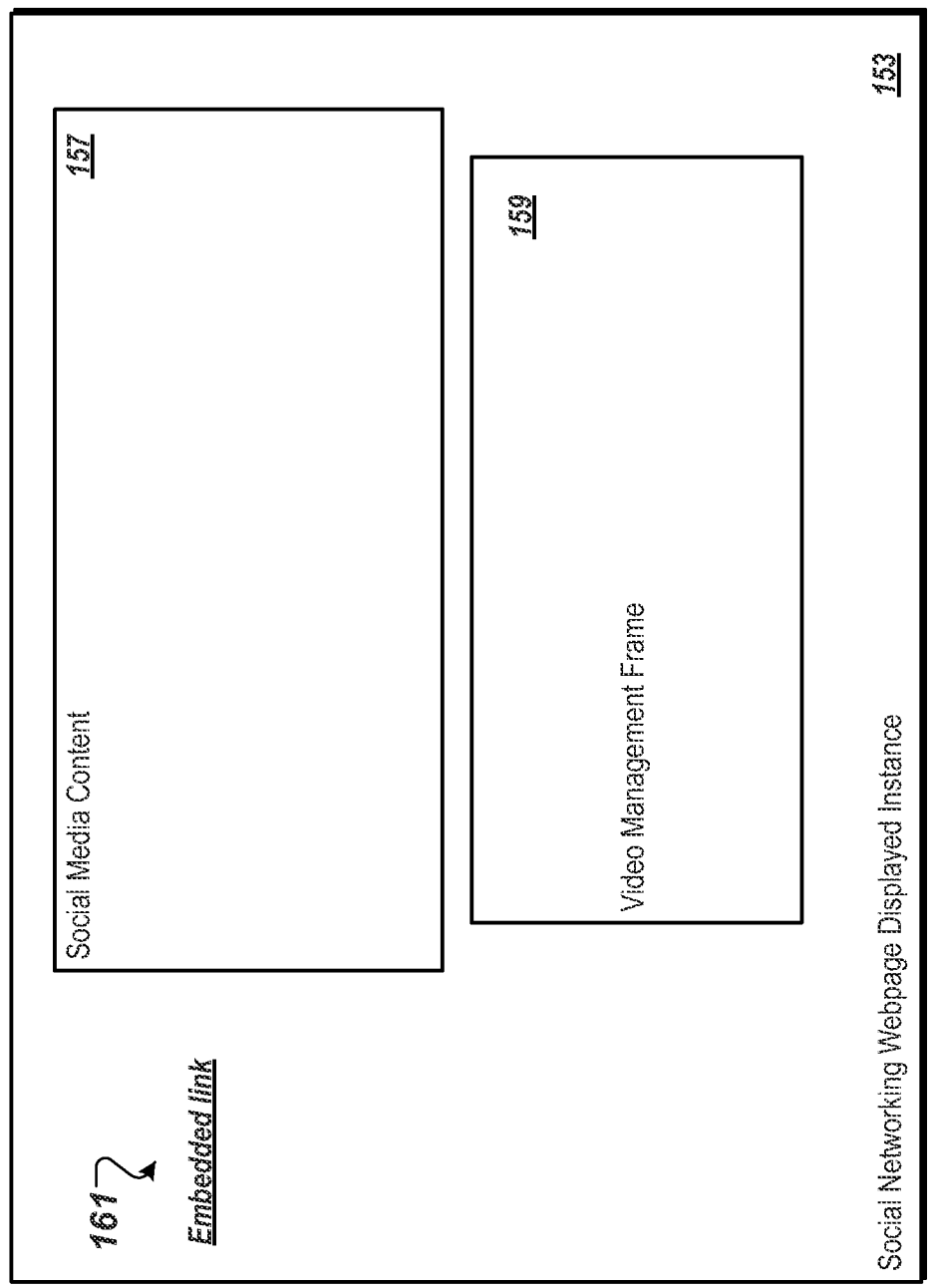

RECORDING AND PUBLISHING CONTENT ON SOCIAL MEDIA WEBSITES

CROSS-REFERENCE TO RELATED APPLICATIONS

The present application is a continuation of U.S. patent application Ser. No. 13/674,768 filed Nov. 12, 2012, which is a continuation of U.S. patent application Ser. No. 13/475,765 filed on May 18, 2012, now U.S. Pat. No. 8,311,382, which claims the benefit under 35 U.S.C. § 119(e) of U.S. Patent Application No. 61/644,909, entitled "Recording and Publishing Content on Social Media Websites," filed May 9, 2012, the entire disclosures of which are incorporated herein by reference in their entirety.

BACKGROUND

This specification relates to creating various forms of content on social media websites and publishing that some content either on the same social media website, other social or general media websites, or on television distribution platforms.

Network technologies enable various types of remote human interaction. For example, people may use text messaging or audio or video content for remote chatting, reporting, conferencing, etc. In some instances, such communication may have a central host, such as a virtual chat room, a reality show, etc. Participants may use phone calls, email, SMS messages, or online audio or video chat to provide input or feedback to the central host. Participants may also communicate through social networking sites. In some cases, communications may relate to television programs that the participants may view, for example, on a conventional television. Such television programs may have their own social networking webpages that provide information about the program, provide additional content related to the program, and/or that facilitate feedback and communications among viewers.

Viewers typically view professionally produced television programs ("programs") and motion pictures ("movies") using traditional television services. Programs, such as various types of game shows, are typically distributed to traditional television service providers by so-called "television networks," who possess the legal rights necessary to distribute the programs, and who are sometimes also involved in producing the programming. Those who provide transmission services for television, and provide television service to viewers, may include "carriers" or Multi-Service Operators ("MSO"), direct-broadcast satellite (DBS) providers, and/or telecommunication ("Telco") providers.

Television transmission or distribution systems used by traditional carriers of television programming include terrestrial broadcast stations, satellite television, and cable television systems, as well as telecom delivery network services such as VDSL and FiOS offered over broadcast telecommunication or data networks, whose operators provide television services similar to what are offered by cable and satellite television service providers. Standards have also been formulated, or are in the process of being formulated, for using Internet protocols and the public Internet to distribute television programming using "live" IP-multicast or IP unicast streams that can be received by anyone with any type of broadband data connection to the Internet.

SUMMARY

Implementations of the present disclosure are generally directed creating various forms of content on social media websites and publishing that some content either on the same social media website, other social or general media websites, or to television distribution platforms.

In one general aspect, a method for recording and publishing contents can include providing, on a first social networking webpage hosted on a social networking system, an imbedded link to media recorder software stored on a video management server system external to the social networking system; receiving a request to invoke the media recorder software within a displayed instance of the first social networking webpage; providing, using the media recorder software on the external video management server system, a video recorder interface through an application programming interface on the social networking system in response to the request, wherein the video recorder interface is adapted to allow a user to record video to the external video management server system from within the displayed instance of the first social networking webpage; receiving a video stream at the external video management server system, wherein the video stream defines video captured through the video recorder interface; generating a video file using the received video stream; storing the video file on the external video management server system; selecting the stored video file for distribution via one or more communication networks; and providing, using media player software on the server system and an application programming interface on one or more web server systems external to the video management server system, the stored video file for display within a plurality of displayed instances of one or more webpages hosted on the one or more external web server systems. Other aspects include corresponding apparatus, systems, and computer software, stored on a computer storage medium and executable on one or more computers.

These and other embodiments can each optionally include one or more of the following features. The one or more external web server systems include the social networking system. Information associated with user accounts for a plurality of displayed instances of one or more webpages hosted on the social networking system and/or information associated with a user account for the displayed instance of the first social networking webpage is received at the external video management server system. The video file is transcoded to an appropriate video file format automatically depending up an intended destination. A quantity of requests to access the video file using the media player software is tracked, and the tracked quantity of requests to access the video file is used to select the video file for inclusion on a second social networking webpage hosted on the social networking system. User ratings of the video file are monitored using the media player software, and the user ratings of the video file are used in selecting the video file for inclusion on a second social networking webpage hosted on the social networking system. Viewer response to the video file is monitored using the media player software; the viewer response is used in selecting the video file for inclusion on an additional webpage hosted on a web server system external to the video management server system; and the stored video file is provided for display within a plurality of displayed instances of the additional webpage in response to the selection of the video file for inclusion on the additional webpage. The additional webpage is associated with a television program. Viewer response to the video file is monitored using the media player software, and the viewer response is used in selecting video defined in the video file for inclusion in a linear television program. A video is selected from a plurality of videos received through the media recorder software on the external video management server system for inclusion in a television program. Access to editing tools is provided through the media player software, wherein the editing tools allow a user to edit the stored video file. The video recorder interface is provided in an iFrame within the first social networking page. A request is received, through the video recorder interface and using the media recorder software on the external video management server system, to distribute the video file via one or more web services external to the social networking system. A request is received, through a frame displayed using the external video management server system using an application programming interface on the one or more web server systems, to distribute the video file via one or more web services external to the social networking system.

In another general aspect, a computer storage medium is encoded with a computer program. The program includes instructions that when executed by data processing apparatus cause the data processing apparatus to perform operations including providing a video recorder interface using an application programming interface on a social networking system, wherein the video recorder interface is adapted to allow users to record video streams to a video management server external to the social networking system and the video recording interface is included within displayed instances of a social networking webpage hosted on the social networking system; receiving a plurality of video streams, wherein each video stream defines video captured through the video recorder interface on a respective displayed instance of the social networking webpage; generating a plurality of video files based on the received video streams; storing the video files on the video management server; selecting one or more of the stored video files for inclusion on the social networking webpage; and providing, using an application programming interface on the social networking system, the selected stored video files for display within a plurality of displayed instances of the social networking webpage. Other aspects include corresponding apparatus, systems, and methods.

These and other embodiments can each optionally include one or more of the following features. Information associated with a user account for at least some of the displayed instances of the social networking webpage is received and stored. Access to the stored video files is provided over one or more communication networks for display on a user device; viewer responses to the stored video files are monitored; and the viewer responses are used in selecting the stored video files for inclusion on the social networking webpage. The viewer responses include at least one of viewing a respective one of the stored video files or providing a rating of a respective one of the stored video files. One or more of the stored video files are selected for inclusion on the social networking webpage based upon predefined criteria relating to viewer responses. Access to editing tools is provided, wherein the editing tools allow at least one of a user or a producer to edit one or more of the stored video files. At least one video corresponding to the selected video files is transmitted for inclusion within a linear television program.

In another general aspect, a system includes one or more servers operable to interact with a user device and to provide a video recorder interface using an application programming interface on a social networking system, wherein the video recorder interface is adapted to allow users to record video to a server external to the social networking system and the video recorder interface is included within displayed instances of a social networking webpage hosted on the social networking system; receive a plurality of video streams, wherein each video stream defines video captured through the video recorder interface on a respective displayed instance of the social networking webpage; generate a plurality of video files based on the received video streams; store the video files; and provide, using an application programming interface on the social networking system, selected stored video files for display within a plurality of displayed instances of one or more webpages hosted on the social networking system. Other aspects include corresponding apparatus, methods, and computer software, stored on a computer storage medium and executable on one or more computers.

These and other embodiments can each optionally include one or more of the following features. The system includes a video hosting server for transmitting the stored video files over at least one network to a user device. The one or more servers are further operable to select one or more of the stored video files for inclusion on the social networking webpage based on activity detected by the video hosting server.

Particular embodiments of the subject matter described in this specification can be implemented so as to realize one or more of the following advantages. A link to a proprietary media player can be embedded in a social networking webpage. The link can allow users to access the proprietary media player based on their credentials for accessing the social networking webpage. The media player can include functionality for recording, playback, and editing of videos using proprietary media player software that resides on an external server system, but made available through an embedded iframe on a social networking webpage, and that provides the media player within a social networking webpage. For example, a social networking webpage associated with a television program can allow users to record videos directly to an external video hosting server associated with the proprietary media player and/or the television program. Links to the videos can be embedded in the user's own social networking page, a social networking page associated with the television program, a social networking page associated with a television network, a social networking page associated with an advertiser or ad sponsor of a television show or television network, and other websites. Users can view the videos on the social networking web page, and the external video hosting server can track the number of times each video is viewed. In addition, the video hosting server can track information relating to each viewer (e.g., demographic or statistical information), as provided through an application programming interface with the social networking provider. Advertisements or other information (e.g., pre-roll, post-roll, or ticker-type advertisements or information) can also be provided along with the videos and the number of views can be tracked (e.g., for determining a number of advertising impressions). Videos can be edited by the user using editing functionalities of the media player software, either through editing tools built into the video playback interface or using a separate editing interface built into the media player software or provided by separate media editing software. Videos can also be edited by an administrator or producer. Television program producers can leverage information about views or ratings of videos to identify videos for inclusion on a television program and/or on a social networking or other website associated with the television program. Advertisers can leverage information about views or ratings to target specific demographic profiles with appropriate advertising messages. Users can forward recommendations to view a particular video through services external or internal to the social networking system. Entities can more conveniently, more safely, and more accurately control content posted on their social networking webpages leading to reduced expenditure to monitor their social networking webpages.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1B illustrates a social networking webpage displayed in the user device of FIG. 1A.

Like reference numbers and designations in the various drawings indicate like elements.

DETAILED DESCRIPTION

Figure 1A:
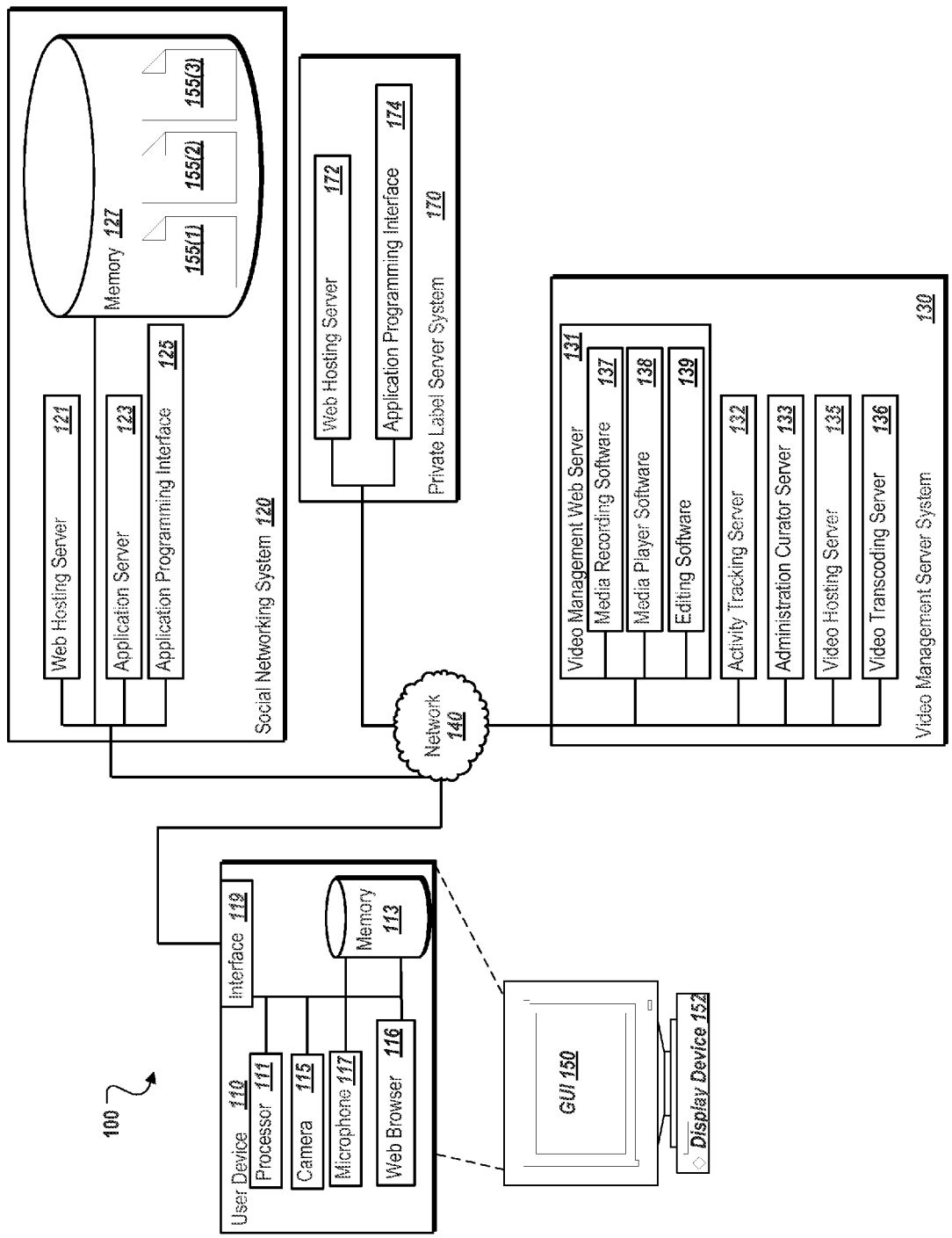
FIG. 1A is a functional block diagram of an architecture for embedding a media player in a social networking website.

Implementations of the present disclosure are directed to systems and methods of allowing users to record videos within a social networking webpage. Using a software development kit and/or application programming interface provided by the social networking provider, for example, a third party can embed a link within a social networking webpage. When a user selects the link, a frame within the page can be opened in which a media recorder hosted by a third party server can be displayed. The media recorder can be implemented in software (e.g., as described in U.S. patent application Ser. No. 13/185,471, entitled "Content Creation and Distribution System," the contents of which are incorporated herein in their entirety), which can be used to record videos at the third party server using a camera built into or otherwise connected to a user computer, e.g., a smart phone, laptop computer, desktop computer, or other computing device. For example, video content can be captured on a user device and formatted according to predetermined constraints using a web application or an installed application. The video content, for example, can be submitted for potential inclusion in a television program. By formatting the video content according to predetermined constraints, the video content can be transcoded into a format appropriate for inclusion in a linear television programming schedule using an automated transcoding workflow corresponding to the predetermined format to ensure that the transcoded video file complies with requirements of a particular television broadcaster or television uplink facility. The video can also be automatically transcoded into one or more formats appropriate for alternative distribution media (e.g., Internet distribution or inclusion in a movie production). The video file can undergo an automated review process to check for inappropriate content and/or to confirm compliance with formatting requirements. The video file can also undergo a manual review for content marked as potentially inappropriate and/or to select among available videos for inclusion in a television production. Transcoding and review can be performed in accordance with attributes associated with the video content (e.g., identifying a particular television program that the video content is intended to potentially be included in) and/or user credentials for a user that submitted the content (e.g., user credentials indicating whether the user is authorized to submit content for Internet and/or television distribution).

The media recorder and/or a separate media player may include built-in functionality to allow the recording user to edit the video (e.g., trim video, add still photos, add audio, introduce special effects, etc.).

A media player can also be used to view videos once they are captured and stored on the third party server. For example, a video captured by a particular user can be stored on the external server system and can be made available for viewing through an embedded iframe within a social networking webpage associated with the particular user (e.g., the user's wall in Facebook®) and/or through other webpages or online access techniques (e.g., YouTube®, Twitter®, or a private-label webpage). When a user selects the video for viewing, the media player is invoked, and the video is played (e.g., streamed) on the requesting user's device. If the viewing user has authorized sharing of personal information with the third party that provides the media player (e.g., when invoking the media player to record a video or in another prior interaction with the third party server), information about the user (e.g., demographic information) can be provided to the third party server in response to the user selecting the video for viewing.

Particular videos can be selected for inclusion on a social networking webpage associated with an entity that may collect videos from numerous users (e.g., a television show or television network). For example, videos can be selected based on viewing activities for the videos, such as a number of accessing requests, favorable indications (i.e., number of clicks on the "Like" button by other viewers), viewer comments or feedback, etc. Thus, viewing activities for videos on the social networking website can be used as an initial screening of video content to determine whether the video is potentially desirable for inclusion on an entity's own web site or social networking webpage. The videos, once selected, may be included on a social networking webpage or other webpage for a television show or other entity and may be used, for example, to further screen videos for potential inclusion in a television program or other distribution. An administrative editing and screening server (e.g., as described in U.S. patent application Ser. No. 13/185,477, entitled "Administration of Content Creation and Distribution System," the contents of which are incorporated herein in their entirety) may also be used to screen videos (e.g., for inappropriate content) and/or edit videos before posting the videos on a webpage or including the videos in a television program.

FIG. 1A is a functional block diagram of an architecture 100 for embedding a media recorder in a social networking website. The architecture 100 includes a user device 110, a social networking system 120, a video management server system 130, and a private label server system 170. The architecture 100 can be provided as a set of interconnected software and server systems. Communications between the user device 110, the social networking system 120, the video management server system 130, and the private label server system can be performed across or via network 140. In general, the architecture 100 can provide a system for recording and publishing video content on a social networking platform or on other web-based or television-based platforms. The video content can also include audio content and can include, for example, full-motion 24-30 frames per second video with constant or variable bit rate audio. The video content can be viewed or displayed on a graphical user interface (GUI) 150 displayed on a display device 152. The display device 152 may be physically attached to the user device 110, and the GUI 150 may display information received from both the social networking system 120 and the video management server system 130, or from both the private label server system 170 and the video management server system 130.

At a high level, a web server 121 of the social networking system 120 provides one or more social networking webpages 155(1), 155(2), 155(3) to the user device 110. Users can interact with contents on each social networking webpage 155, for example, by selecting hyperlinks, icons, and/or images or by entering information in available fields. The social networking webpage 155 may include a link that launches media recorder software 137 stored on the server system 130. The media recorder software 137 provides functionality enabling users to record a video using a video recording interface that provides recording controls such that the recorded video is stored on the server system 130 (e.g., the video is streamed to the server system 130 as described in U.S. patent application Ser. No. 13/185,471). The recorder software 137 can use scripts or other software instructions, for example, that enable interfacing with an integrated camera 115 and microphone 117 on the user device 110, and users may further edit recorded videos using a video editing interface provided by editing software 139 on the server system 130.

Recorded videos can be made available for viewing by other users (e.g., after the video is approved through an administrative review or after the submitting user authorizes distribution) on other pages of the social networking system (e.g., the submitting user's personal social networking webpage) or on other websites. Viewing may require use of media player software 138 and/or retrieving videos from a video hosting server 135 of the video management server system 130. The video management server system 130 can monitor viewer activities related to the videos accessed from the video hosting server 135. For example, the video hosting server 135 can track the number of times a video is viewed and can, in some cases, track demographic information relating to the individual viewers. In addition, viewers may indicate they like the video by registering an indication of approval on a counter, by providing comments or ratings, or other methods. Such indications can be provided to and/or stored on the social networking system 120 or the video management server system 130. For example, viewer feedback can be provided to and stored on the social networking system 120, and the video management server system 130 can access the feedback through an application programming interface 125 of the social networking system 120. The video management server system 130 can determine if some of the videos have satisfied certain publication criteria and select those that have satisfied the criteria for inclusion in displayed instances 153 (see FIG. 1B) of the social networking webpage 155, other media associated with the video management server system 130, or on a private label server system 170. Additional details of the components are described below.

The user device 110 includes a processor 111, a memory 113, a camera 115, a microphone 117, and an interface 119, and can include other input and output devices. The camera 115 and the microphone 117 can enable the user device 110 to capture videos. The web browser 116 can be any web browser capable of running on the operating system on the user device 110 and enable the user device 110 to display social networking webpages 155 and other webpages. The interface 119 can enable the user device 110 to connect with remote servers to receive and transmit data (e.g., video data, user data, web page content, etc.). Webpage content and other data can be stored in the memory 113.

The social networking system 120 includes a web hosting server 121, an application server 123, an application programming interface 125, and memory 127. In general, the social networking system 120 can allow registered users to sign on (e.g., using a user name and password) to access social networking services. For example, the social networking services may include Facebook®, Twitter®, Myspace®, Google+®, Renren®, and/or other available social networking services. In some implementations, the social networking system 120 enables users to create an account based on their social identities and provides various social networking services to the registered user through the account. For example, social networking services can include seeking other members of similar social identities and making connection with those members, interacting with the connected members via text messaging, blogging, information sharing, making recommendations, and other communications.

The web hosting server 121 can provide one or more social networking webpages 155(1), 155(2), 155(3) through which users can access services provided by the social networking system 120. For example, the web hosting server 121 can host a registration webpage that allows users to register with the social networking system 120. The social networking system 120 can also provide a first social networking webpage 155(1) to the user device 110. For example, the first social networking webpage 155(1) can be associated with an entity, such as a television program, and can include web content associated with the entity. In some instances, the first social networking webpage 155(1) can be associated with the registered user and can include web content. The web content hosted in the social networking services can be provided directly by the social networking system 120 and can include links embedded in the first social networking webpage 155(1) that can be used to retrieve content hosted by third parties. User information and other content of the social networking webpage 155 may be stored in memory 127 and served to user devices by the web hosting server 121, while multimedia plug-ins, games, and other third party applications may be provided by the application server 123 and/or accessed from an external server (e.g., the video management server system 130) through an application programming interface 125. The social networking system 120 may include one or more such application programming interfaces 125 (and/or software development kits) through which third parties can define applications or services that may be hosted on external third party servers.

In some implementations, the social networking webpages 155 can provide users with access to a thin client application (or web application) that displays information and allows users to interact with available social networking services. In some embodiments, the application server 123 can support the web hosting server 121 for running the thin client application. The application server 123 can also provide applications created and published by third parties, as well as local applications within the social networking system 120.

The application programming interface 125 can provide access to applications hosted on external servers. For example, third parties may develop applications for users registered with the social networking system 120 to submit information (e.g., audio/visual content), interact with other users, and conduct other activities. The application programming interface 125 can provide access to video players, recorders, games, calendars, blogs, messages, and other applications to the social networking webpage 155. For example, the application programming interface 125 and/or a software development kit can be used to define, within the memory 127 of the social networking system 120, an appearance (e.g., text, icons, or images) of an embedded link that appears on the social networking webpage 155 and a network address from which a web application can be retrieved when the link is selected. The application programming interface 125 can provide access through the embedded link in the social networking webpage 155 to web applications stored on the video management server system 130, including the media recorder software 137, the media player software 138, and the editing software 139. When a web application is invoked by selecting the embedded link, the web application can be executed on the video management server system 130, resulting in display of a corresponding application interface within a frame of the social networking webpage 155. Thus, the application programming interface 125 can allow third party entities to embed links to external applications or services hosted on a third party server. The application programming interface 125 can facilitate the delivery of content (e.g., a video recording user interface, a video playback user interface, or an editing user interface) that is displayed within social networking webpages 155 and the exchange of information (e.g., user demographic data, video viewing data, feedback data, link or image data for display within the social networking webpages 155) between the social networking system 120 and the server system 130. The application programming interface 125 may include specifications for routines, data structures, object classes, variables, and other objects. The application programming interface 125 specification can take various forms, including an International Standard such as POSIX, or vendor documentation such as the Microsoft Windows API, or the libraries of a programming language, e.g. Standard Template Library in C++ or Java API.

The memory 127 of the social networking system 120 stores data and program instructions for the social networking webpage 155. In some instances, the web hosting server 121 or the application server 123 may include its own memory or may use the memory 127. The memory 127 may include any type of memory or database module and may take the form of volatile or non-volatile memory including, without limitation, magnetic media, optical media, random access memory (RAM), read-only memory (ROM), removable media, or any other suitable local or remote memory component. The memory 127 may store various objects, object models, and data, including classes, frameworks, applications, backup data, business objects, jobs, webpages, webpage templates, database tables, process contexts, repositories storing services local to the social networking system 120 and any other appropriate information including any parameters, variables, algorithms, instructions, rules, constraints, or references thereto associated with the purposes of the social networking system 120 and its functionality. In some implementations, including in a cloud-based system, some or all of the memory 127 may be stored remote from the social networking system 120 and communicably coupled to the social networking system 120 for usage. As described above, memory 127 can include one or more meta-models associated with various objects included in or associated with the underlying platform. Specifically, memory 127 can store items and data related to the social networking webpage 155 and/or other collaboration-related entities or components.

The video management server system 130 includes a video management web server 131, an activity tracking server 132, an administration curator server 133, a video hosting server 135, and a video transcoding server 136. The video management web server 131 can enable the user device 110 to capture and transmit video data to the video management server system 130. For example, the video management web server 131 can provide access to media recording software 137 to enable the user device 110 to be used for video creation. The video management web server 131 can also provide access to media player software 138 to enable playback of videos on the user device 110 and to editing software 139 to provided editing tools for users to edit the created videos. The media recording software 137 can be accessed on the user device 110 as a thin client application such that a recording interface is displayed through the web browser 116 of the user device 110 and used to capture audio/video data that is temporarily buffered in the memory 113 of the user device 110 and sent to the video management server system 130 as a video stream as the audio/video data is captured (as described in U.S. patent application Ser. No. 13/185,471). For example, during recording, and as the video camera generates video data, the video data can be cached and transmitted to the one or more back-end servers. The web-based recorder may capture and cache sufficient video data to retain broadcast quality requirements and transmits the video data to the one or more back-end servers in quasi-real time. More specifically, as video data is generated, the video data is cached and a predetermined amount of video data is intermittently transmitted from the client computing device to the one or more back-end servers. The pre-determined amount of video data that is transmitted can be determined based on the available transmission bandwidth instead of, for example, adapting image quality to meet limited bandwidth availability. The video stream can be received by the video management server system 130, and the video hosting server 135, for example, can generate and store a video file that corresponds to the received video stream. In general, the media recording software 137, the media player software 138, and the editing software 139 can be invoked through the application programming interface 125 of the social networking system 120 and displayed within a frame of a social networking webpage 155. Similarly, the media recording software 137, the media player software 138, and the editing software 139 can be invoked through the application programming interfaces on other webpages (e.g., hosted by a private label server system 170 as further described below).

In general, as described in U.S. patent application Ser. No. 13/185,471, the system 100 can provide users with video file recording and editing capabilities that provide an easy-to-use interface, do not require the users to have knowledge of video formatting or computer file systems, and facilitate automatically uploading of video files or other content to a server. Such uploading can use a web server-based thin client application capable of displaying a user interface through a browser on a user device or a specialized application capable of running on a user device (e.g., on a mobile device or a tablet computer). In either case, the application can interface with user device's native recording capabilities to capture either high definition ("HD") format or standard definition ("SD") format video files. The video file recording and editing software can guide the user through a video file creation and submission process that captures video via a video camera either built-in, or connected to, the user device to create a video file that meets requirements for submission to a content distribution sub-system, and submits the video file to the content distribution sub-system.

The system can thus facilitate convenient creation and seamless uploading of crowd-sourced video files (e.g., audio-visual content created for inclusion on a social networking webpage and/or in response to a broadcasted request for videos relating to a particular topic) or other user-generated content. The system can ensure that the submitted video files satisfy certain parameters so that the files have a quality level appropriate for inclusion in linear television programming and so that the files can be automatically and conveniently transcoded into one or more video file formats (in accordance with relevant frame rates, bit rates, etc., which may be dependent on the intended destination of the content) according to the intended destination.

After video files are created and stored on the video management server system 130, the media player software 138 can be invoked to play the video on the user device 110 used to capture the video or on a different user device 110. In some implementations, the media player software 138 can be executed on the video management web server 131 such that the video is displayed on the user device 110 in a thin client application environment (e.g., the video file is executed by the media player software 138 on the video management web server 131 and is sent to the user device 110 as a video stream). The video may be displayed within a frame (e.g., an iFrame) of a social networking webpage 155. For example, a still image of the video and/or a link to the video can be displayed on a social networking webpage 155. When a user selects the image or other link, a video playback frame can be displayed within the social networking webpage 155, although the contents of the frame (i.e., the video) may be provided by media player software 138 executed on the video management web server 131. In other implementations, the media player software 138 can be stored locally in the memory 113 of the user device 110 and used to play a video file sent from the video management server system 130 to the user device 110. The editing software 139 can also be invoked on a user device 110 to display an editing interface that includes editing tools for editing contents of the video file. As with the media player software 138, the editing software 139 can be executed on the video management web server 131 such that the video is displayed on the user device 110 in a thin client application environment or can be stored locally in the memory 113 of the user device 110 and used to edit a video file sent from the video management server system 130 to the user device 110. Both the media player software 138 and the editing software 139 can be provided to a user device 110 within a frame of a social networking webpage 155 hosted on the social networking system 120 or within a frame of a webpage hosted on the private label server system 170.

As users access video files stored on the video management server system 130, the server system 130 can receive and monitor viewer activities related to the videos. For example, because the videos are stored within the server system 130, the server system 130 can monitor access requests for the videos (submitted through the social networking system 120 or other host sites) and make operational decisions based on the viewer activities. For example, viewer activities can include indicating that the viewer likes the video, leaving text comments to the video, attaching responding media to the video, sharing the video, reposting the video on other websites, and other activities. The activity tracking module 132 can perform monitoring of such access requests and other viewer activities related to the video being played, and viewer information and viewing activity data can be used to make decisions regarding further publications of the video (e.g., on other websites or webpages within the same website or web server system).

In some implementations, the activity tracking module 132 monitors activities related to the media player software 138 to determine if certain video clips have satisfied predetermined criteria for publication in other displayed instances. For example, activity tracking module 132 can monitor if a certain video has been liked by a predetermined number of viewers (e.g., a thousand viewers), or at a particular rate (e.g., a thousand views in 2 weeks). The monitored viewership may be a result of its own popularity among viewers (e.g., funniest home video), its relevance to current news topics (e.g., the latest news), its correspondence to certain media (e.g., correct answers to a TV quiz), or other reasons.

The administration curator server 133 may perform automatic screening of video content (e.g., for inappropriate content) and may allow an administrator or television producer to make manual decisions regarding Internet publication, inclusion on a television program, or editing. For example, the administration curator 133 may be used to implement the techniques and systems described in U.S. patent application Ser. No. 13/185,477. In some implementations, the administration curator server 133 can be used to screen video content in a video file before the video file is made available for viewing from the video management server system 130 (e.g., by anyone other than the user who recorded the video). Such review can ensure, for example, that the operator of the video management server system 130 or a producer of a television program avoids distribution of content that does not meet the operator's or producer's standards for quality or appropriateness. In addition, the approval process can allow an administrator or producer to control video content posted to a social networking webpage or other webpage. In some implementations, the approval process may occur both in phases. For example, an administrative operator of the video management server system 130 may review and approve the video before the video is posted even on the submitting user's selected distribution channel(s) (e.g., social networking webpages associated with the user's respective social networking accounts), and an administrator or producer associated with a publishing entity may review and approve the video before the video is posted on the entity's social networking website(s) and/or private label websites (e.g., after attracting the attention of the entity through tracking activity). The former initial review may be allow the operating entity of the video management server system 130 to ensure, for example, that the video management server system 130 is not associated with inappropriate content (e.g., to avoid damaging the reputation of the video management server system 130 and/or advertisers on the system 130). The latter secondary review may allow the publishing entity to control content on its social networking websites and/or other private label websites.

The video hosting server 135 in the video management server system 130 can provide storage, organization, and connection tools for the video management web server 131. In addition, a video transcoding server 136 can provide conversion tools for converting incoming video streams received from user devices into a video vile. For example, when users create audio/video content using the media recorder software 137, the video transcoding server 136 can receive the incoming video stream and automatically convert the video stream into a video file having one or more formats. The video stream can be automatically converted into one or more formats appropriate for further distribution as described in U.S. patent application Ser. No. 13/185,471. The video file can be transcoded to a format that is appropriate for a designated downstream use. In addition, an image file can be generated and can be provided in JPEG format or another appropriate image file format. The image file is used as a thumbnail image representing the video file. In some implementations, the video hosting server 135 receives a multimedia video stream from the media recorder software 137 in real time as the contents are created. In some other implementations, the multimedia contents can first be created locally in the user device 110 and uploaded to the video hosting server 135 after creation. The video hosting server 135 stores the video files for subsequent editing through the editing software 139, review and approval through the administration curator server 133, and viewing through the media player software 138. The video hosting server 135 can enable users to create search terms as well as other tag information along with the video for organization. For example, the video hosting server 135 can include databases that categorize videos based on common features, as well as common searchable terms or keywords. The video hosting server 135 can insert pre-roll, post-roll, banners, tickers, or other content to be served to viewers for display with a video hosted on the video hosting server 135 (e.g., at the direction of curators or administrators). Content can also include tools that allow users to distribute a video to other users (e.g., by sending a message linking to the video through electronic mail or through a social media service or posting a link to the video on a webpage). Such content can be included with the video when it is recorded or viewed through a social networking webpage 155 or other webpage. For example, the video hosting service 135 may interface with the web server 121 through the application programming interface 125 to provide video and other content to be displayed in an iframe or other frame embedded within a social networking webpage 155. Distribution tools displayed within the frame of the social networking webpage 155 can be used to cause the video hosting server 135 to automatically distribute a video to other users using user profile data stored on the video hosting server 135. For example, the user profile data may define user account and/or login information for other social media services or email services that enable the video hosting server 135 to distribute the video in response to a user selection of the distribution tools. The distribution tools can allow a user to recommend a video to others through the external video management server system 130, which, in turn, distributes the recommended video (or links thereto) using one or more social networking systems or other web server systems. Such capabilities may also be provided on other webpages (e.g., hosted on a private label server system 170) other than those hosted on the social networking system 120. By hosting videos on the external video management server system 130, the he video hosting service 135 can also track the number, frequency, and destination of video playbacks and can track advertising impressions (e.g., pre-rolls, post-rolls, etc.) associated with such video playbacks to receive credit for advertising impressions from advertisers. The external video management server system 130 and any entities on behalf of which the system 130 hosts content can thus obtain better information about viewing of videos than if the videos were hosted on the social networking system. Similarly, the video management server system 130 can obtain information regarding recommendations that are provided through the video management server system 130, such as the number and destination of such recommendations.

The private label server system 170 can include a web hosting server 172 and an application programming interface 174. In some implementations, media hosted on and/or recorded through the video management server system 130 can be distributed through the private label server system 170. For example, videos can be selected, after meeting certain criteria associated with the activity tracking server 132, for further distribution through a private label website hosted on the web hosting server 172. In some implementations, such videos can be stored on the private label server system 170 and distributed using a media player hosted on the private label server system 170 or downloaded onto user devices 110. In other implementations, the videos can be accessed through a private label website through the application programming interface 174, which can be similar to the application programming interface 125 of the social networking system 120.

Functionalities of each of the social networking system 120, the video management server system 130, and the private label server system 170 can be segmented in others ways across multiple servers or can be combined in different ways than described above (e.g., some of the functions described as being performed by different servers could be combined in a single server), and the various server systems may also include other functionalities than described above.

FIG. 1B illustrates a social networking webpage displayed in the user device of FIG. 1A. Typically, the user device 110 accesses the social networking services provided on the social networking system 120 via a social networking webpage 155 displayed on the GUI 150. The social networking webpage 155 can be displayed on a particular user device 110 as a displayed instance 153 that displays the currently requested content. Generally, a displayed instance 153 of the social networking webpage 155 includes social media content 157 hosted by the social networking system 120. The displayed instance 153 may also include one or more embedded links 161 that are each defined using a software development kit, application programming interface 125, and/or other programming tools supported by the social networking system 120. An embedded link can be used to invoke the media recorder software 137, the media player software 138, and/or the editing software 139. For example, when the social networking web hosting server 121 receives a request from the user device 110 to invoke media recorder software 137 within the displayed instance 153, a video management frame 159 is displayed in the displayed instance 153. Users may request to invoke the media recorder software 137 by clicking on an icon or a link that includes a URL for the media recorder software 137. In response, a video recorder interface is instantiated within the video management frame 159 through the application program interface 125 that enables integration with the displayed instance 153 of the social networking web page 155. The application program interface 125 allows the video recorder interface to appear in the displayed instance 153 as an integral part of the social networking webpage 155. For example, in some implementations, the video management frame 159 can be displayed using an iFrame within the social networking webpage 155 or other webpage. Other formats may also be used. The video recorder interface allows a user to record video to the server system 130 using the media recorder software 137 that executes on the server system 130. The media player software 138 can play the videos stored in the video management server system 130 through a media player interface within the video management frame 159 of the displayed instance 153. In some implementations, the media player software 138 can also be accessed through other video-enabled sites or services. The editing software 139 can be used to edit videos stored in the video management server system 130 through an editing interface within the video management frame 159 of the displayed instance 153.

The editing user interface can provide editing tools for users to edit video content. The editing tools can include trimming, cutting, overlaying, combining, interlacing multiple and/or different multimedia contents. For example, users may combine photos, videos, audios, animations, computer graphics, subtitles, texts, and other contents to form a video clip. The edited videos can be saved at the video hosting server 135 and served to user devices as the video is published.

Although the content of the video management frame 159 and the social networking webpage 155 are supported by two different server systems (i.e., the video management server system 130 and the social networking system 120, respectively), they can be seamlessly integrated in displayed instances 153 of the social networking webpage 155. For example, users or viewers may perceive the content of the video management frame 159 as part of the social networking webpage 155. In some implementations, in response to a user selecting a link or an icon on the social networking webpage 155 to invoke an initiation of the media recorder software 137 (e.g., at least if this operation has never been performed by the particular user), the social networking webpage 155 may prompt a message to the user explaining terms and conditions for using the media recording software 137. The user may be required to accept the terms and conditions before being able to proceed with the operation. The user may grant the media recorder software 137, as well as the video management server system 130, limited rights to access account information of the user. The video management server system 130 can then, based on the profile information as well as online activity provided by the user, associate received video and access requests for stored video with user profile information and/or automatically tailor the media recording software 137, media player software 138, or editing software 139 for the user. For example, the media player software 138 may offer an advertisement that is likely to be of interest to the user. The advertisement can be provided from the server system 130 or from some other source. The operator of the server system 130 can thus track advertising impressions and can receive credit for the advertising impressions.

The social networking webpage 155 and the video management frame 159 can be displayed in a GUI 150 displayed on a display device 152 of the user device 110. The GUI 150 may be operable to, for example, allow the user device 110 to interact with at least a portion of the social networking webpage 155. Generally, the GUI 150 can provide with an efficient and user-friendly presentation of social network information provided by or communicated within the social networking system 120. The GUI 150 may include a number of customizable frames or views having interactive fields, pull-down lists, and buttons operated by the user. For example, the GUI 150 may provide interactive elements that allow a user to interact with a particular component within and/or external to the social networking webpage 155, such as the media player software 138, for example. Different portions of the corresponding component's functionality may be presented and accessible to the user through the GUI 150, such as through the social networking webpage 155 (e.g., in a web browser). Generally, the GUI 150 may also provide general interactive elements that allow a user to access and to utilize various services and functions of a particular component.

In some instances, the social networking webpage 155 may be used to access various portions of the social networking system 120. The GUI 150 may present the information of the social networking webpage 155 for viewing and interaction. In general, the GUI 150 is typically configurable, supports a combination of multimedia contents (photos, videos, audios, computer graphics, and other web contents), and is able to build real-time portals, where tabs are delineated by key characteristics (e.g., site or micro-site). Therefore, the GUI 150 can include any suitable graphical user interface, such as a combination of a generic web browser, intelligent engine, and command line interface (CLI) that processes information in the platform and efficiently presents the results to the user visually.

Although illustrated as a single user device 110 in the architecture 100, the architecture 100 generally includes multiple user devices 110 that provide GUIs 150 for interacting with the social networking system 120 using instances of the social networking webpage 155. The user device 110 can be any computing device operable to connect to or communicate with the social networking system 120 and the video management server system 130 using a wireline or wireless connection via the network 140, or another suitable communication means or channel. As used in this description, the user device 110 is intended to encompass a personal computer, touch screen terminal, workstation, network computer, kiosk, wireless data port, smart phone, personal data assistant (PDA), one or more processors within these or other devices, or any other suitable computer. For example, the user device 110 may include a computer that includes an input device, such as a keypad, touch screen, mouse, or other device that can accept user information, and an output device that conveys information associated with the social networking webpage 155, including digital data, visual information, or the GUI 150.

Figure 2A:
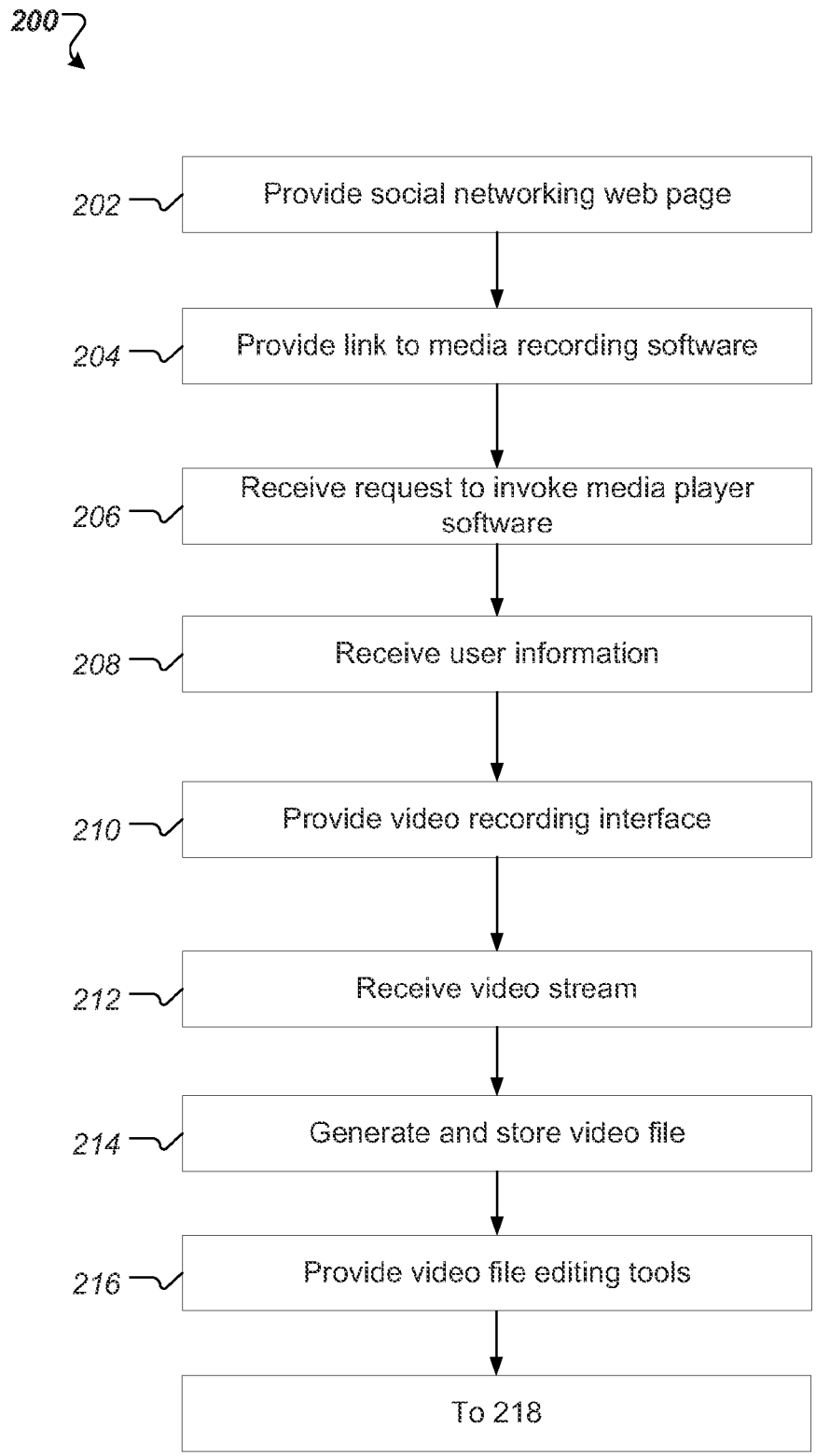
FIGS. 2A and 2B illustrate a flowchart of recording and presenting contents in a social networking website from a server system.
Figure 2B:
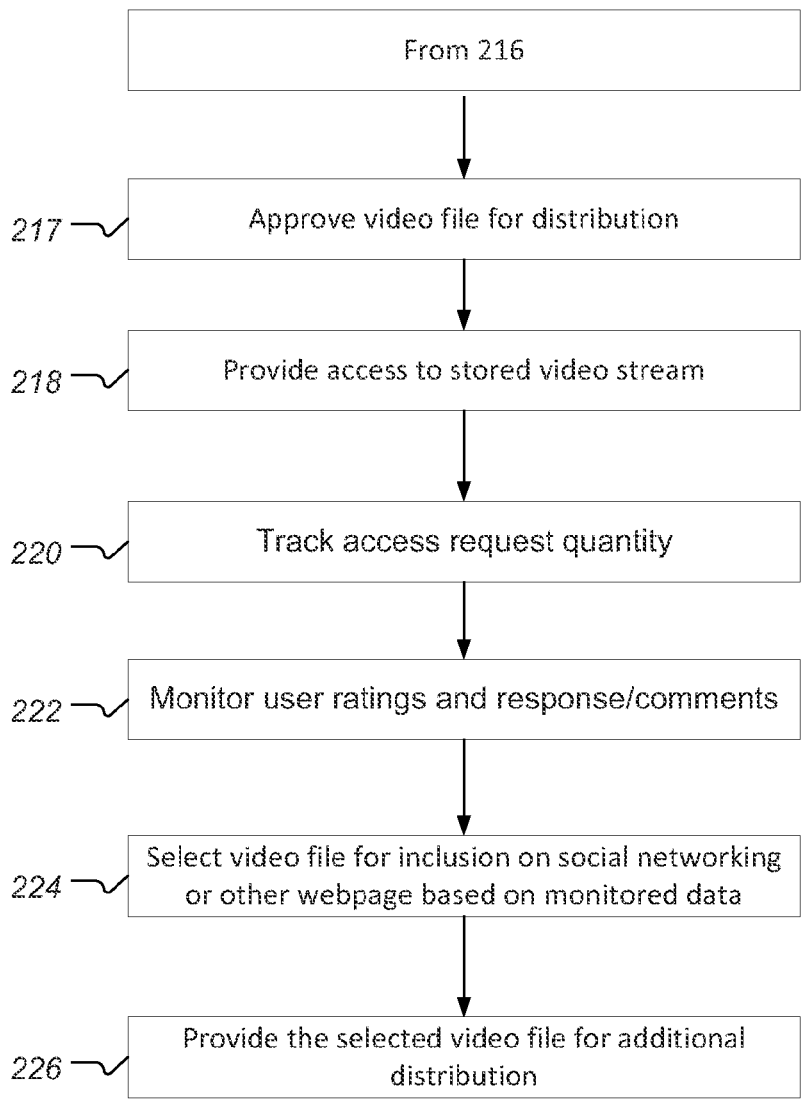

FIGS. 2A and 2B illustrate a flowchart of a process 200 for recording and presenting content in a social networking website from an external server system. The flowchart 200 represents operations that can be performed by the social networking system 120 and the video management server system 130 as shown in FIG. 1A. Although the process 200 is generally described in the context of capturing a single video file from a single user, the process 200 can be used in connection with receiving video streams and generating video files for a plurality of users. At 202, a social networking webpage is provided to a user. For example, the social networking webpage can include various web content related to the user's social network, such as, for example, a list of friends, indication of relationship to these friends, their statuses, multimedia contents shared by them or of them, etc. The social networking webpage may also be a webpage associated with an entity (e.g., a business, a television program, etc.). The social networking webpage is hosted on a social networking system. At 204, a link to media recording software is provided within a displayed instance of the social networking webpage. For example, the link can be an icon, a text link with a URL, or other representation that is embedded in the displayed instance of the social networking webpage and that can be selected by the user (e.g., by clicking on the link using a mouse) to cause execution of an application (e.g., a video recording application).

In response to the user selecting the link, a request to invoke media recording software within the displayed instance of the social networking webpage is received at 206. The media recording software is provided by a server system external to the social networking system that provides the social networking webpage. On the social networking webpage, a message or window may be presented to the user, informing the user of authorization conditions. At 208, the user confirms the authorization and user information is received at the server system that provides the media recording software. For example, information associated with the user's social media user account, such as demographic information, user identifier, user name, etc., is received at the server system that provides the media recording software. The information can be stored for subsequent use in identifying the user or attributes of the user (e.g., to associate received video with the user or to identify the user when the user subsequently accesses content stored on the server system). In this manner, the user's account with the social networking system can be leveraged to provide information to the video management server system 130 without requiring the user to have a separate account with the video management server system 130, which can reduce behavioral friction to submitting videos for potential inclusion, for example, on a television program or IPTV program, or for submission in a contest. In some situations, the server system provides a video recording interface using the media recording software at 210. The video recorder interface is provided through an application programming interface on the social networking system and is adapted to allow the user to record video to the external server system through recording controls of the video recording interface included (e.g., as a frame) within the displayed instance of the social networking webpage.

At 212, the user records a video using the video recorder interface and a corresponding video stream is received at the external server system. For example, the user can record or upload a video using the integrated hardware (e.g., onboard camera, microphone, etc.), or using a dedicated device (e.g., camcorder, camera, etc.) connected to the user device, or other appropriate devices. At 214, the video stream is converted into a video file and stored at the server system. The video stream may be transmitted to the server system and converted into a video file in real time (i.e., as the video is being recorded). In some implementations, video editing tools are provided by the server system at 216. The video editing tools can enable users to modify the video file using various methods such as cutting, trimming, overlaying, combining different media, etc. The video editing tools can be displayed to the user within the social networking website.

At 217, in some cases, the video file is approved for distribution (e.g., through a manual or automated review process). The approval process can result in selecting the video file for distribution on one or more networks. At 218, access to the stored video file is provided to viewers. Access can be provided through social networking websites and websites hosted outside the social networking system on other social networking or private label web server platforms. For example, the stored video file is provided over the Internet or one or more local and global networks. The number of access requests can be tracked at the server system hosting the video file at 220 (e.g., based on accessing the stored video file from the server system and/or on the retrieval of the media player software needed to playback the video). For example, the server system can monitor and log the number, frequency, and other related information associated with requests for the stored video file. The server system can also monitor user/viewer ratings, as well as comments, responses, and other forms of reply at 222. In many instances, the user/viewer rating can include number of "Likes" provided in the social networking services, such as, the like button on Facebook®, the "+1" on Google+®, the star ratings on YouTube®, for example. In some implementations, the server system can monitor viewer responses including text comments, reposting, sharing in other websites or platforms, and other user response activities. In some implementations, additional information, such as information associated with the social networking user accounts of users that view the video can also be collected by the external server system. Based on the monitoring data at 220 and 222, if the video file satisfies certain criteria, the video file can be selected for further distribution at 224. For example, once a video that appears on one or more individual or non-commercial social networking webpages has been viewed a threshold number of times or given a threshold rating, the video can be selected to be included on a commercial social networking webpage (e.g., associated with an entity that requested video content relating to a particular topic). The video can also be selected for further distribution via private label websites.

In some implementations, the social networking webpage or other webpage selected for further distribution of the selected video file at 224 is associated with a television program, such as a game show, a reality show, or other form of public entertainment. The selected video file is made available for display on the social networking webpage or other webpage at 226. Additional viewer response to the selected video file through the additional distribution can be used to determine whether to further include the video file in a linear television program or Internet broadcast (e.g., IPTV) and/or to select among a plurality of submitted video files for inclusion in a linear television program or Internet broadcast.

Figure 3:
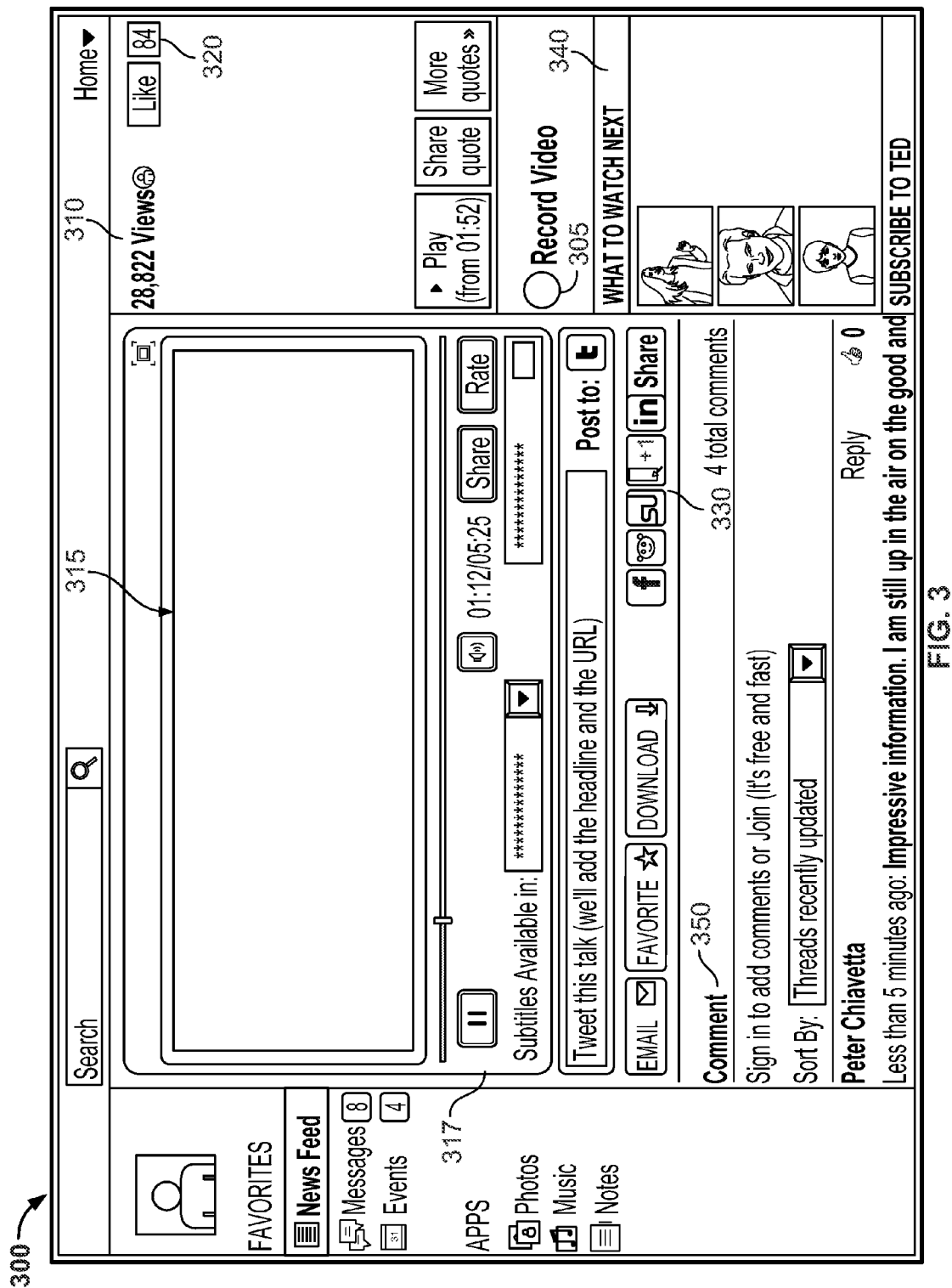
FIG. 3 is an example displayed instance for presenting contents in a social networking website from a server system.

FIG. 3 is an example displayed instance 300 of a social networking webpage for presenting content from a video management server system. The example displayed instance 300 can be viewed by viewers in the GUI of their electronic devices. The displayed instance 300 includes a video record initiation button 305, a media player software frame 317, a counter of views 310, a counter of "likes" 320, a number of sharing options 330, a list of recommendation 340, viewer comments 350, and other features. The video record initiation button 305 can be activated to cause software on the external video management server system to display a video recorder interface for users to create a video clip. In some implementations, the video record initiation button 305 allows users to choose an existing video file to be uploaded.

As illustrated in FIG. 3, the media player software frame 317 includes playback controls, as well as sharing and rating options. The media player software frame 317 includes content provided by the external video management server system for display within the social networking webpage instance 300. The sharing and rating options enable viewers to respond to the video, for example, by reposting the video to other websites, rating the video with a star rating (e.g., from 1 to 5), and other response methods. The media player software window 317 includes a playback screen 315, which can be used to display selected videos, as well as videos captured when the video record initiation button 305 is activated. Statistics of the current video stream may be displayed at the counter of views 310 and the counter of "Likes" 320.

Videos that satisfy certain rating or feedback criteria may be recommended in the list of recommendation 340. Viewers may select these videos to play within the media player software frame 317. The viewer comments 350 allow viewers to leave their comments in responding to displayed videos. The viewers may provide comments and respond to comments after creating a system profile and signed in using the system profile. The viewer comments 350 may also be used to compare with certain criteria for determination of display or publication of the video stream on the social networking website.

Figure 4:
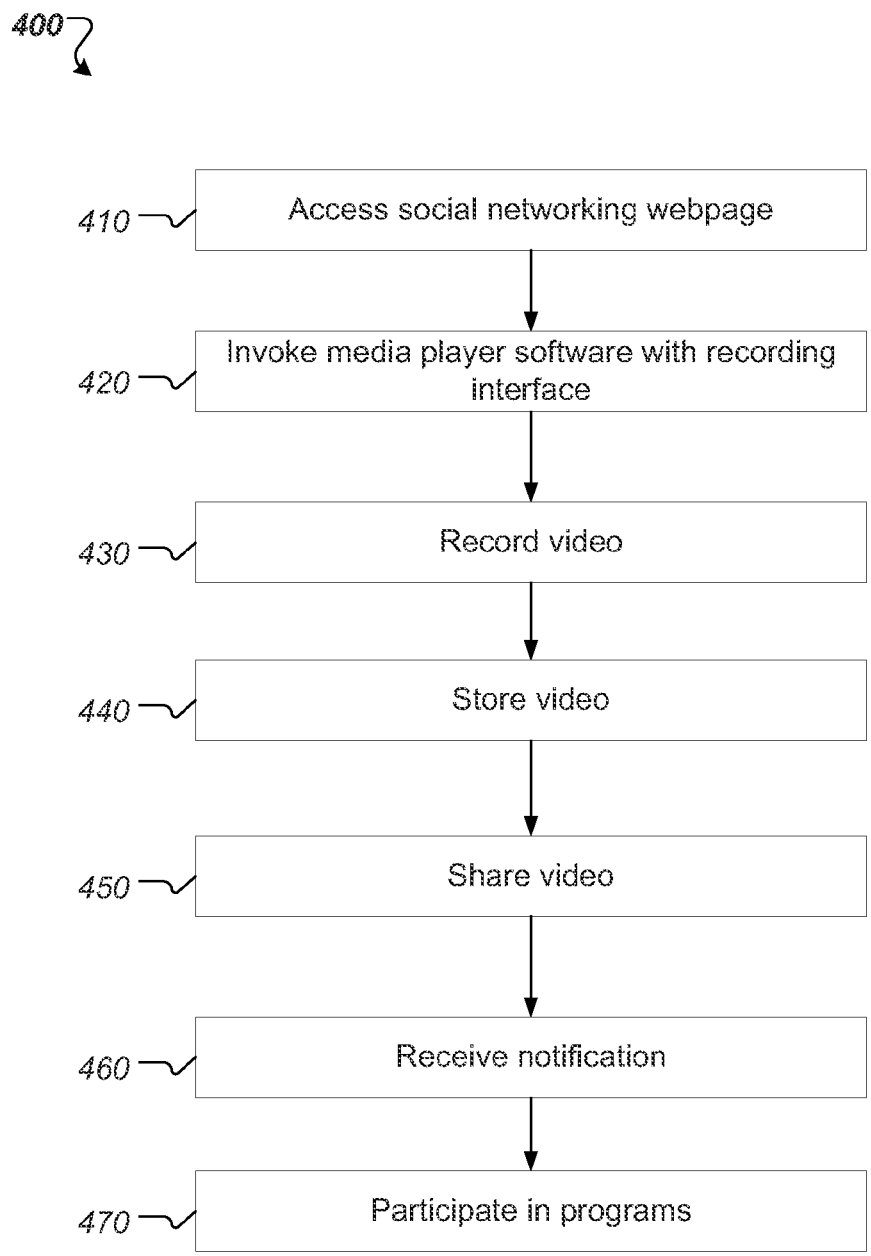
FIG. 4 is a flowchart of recording and viewing contents in a social networking website in a user device.

FIG. 4 is a flowchart of recording and viewing contents in a social networking website on a user device. At 410, a user can access a social networking webpage on a user device. The user device may be a laptop computer, a desktop computer, a netbook, a tablet PC, a PDA, a smart phone, or other mobile or non-mobile computer or other electronic device that enables basic computing and access to a network accessible to the social networking webpage. The user can invoke media recording software that enables a recording interface at 420. For example, the user may click on a link or an icon directing to media recording software hosted on a server system remote from the social networking system. The video recording interface allows the user to record a video clip at 430 and store the video clip to a server at 440. The video clip may be recorded using various devices including onboard cameras, dedicated cameras, camcorders, or other equipment. The uploaded video is shared at 450 over one or more networks. The user may choose which network for posting the video and include searchable features to promote the video clip. If the video becomes well received and earns certain rating that satisfy predetermined criteria associated with the social networking website, the user receives a notification at 460. The notification may include information about participation in programs related to a TV show associated with the social networking website. The user can then choose to participate in the TV show at 470.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A method comprising:
    receiving a request to invoke media recorder software within a displayed instance of a video recorder interface on a mobile device, wherein the video recorder interface is implemented using an application on the mobile device;
    establishing a connection to media recorder management software stored on a video management server system;
    providing, using the media recorder software executing on the mobile device, a video recorder interface in response to the request, wherein the video recorder interface is adapted to allow a user to record video from within the displayed instance of the video recorder interface to the video management server system as the video is captured using the media recorder software executing on the mobile device;
    receiving a video stream at the video management server system, wherein the video stream defines video captured using controls included in the video recorder interface and wherein the video stream is recorded using the media recorder software executing on the mobile device;
    generating a video file using the received video stream; and
    storing the video file on the video management server system.

2. The method of claim 1 further comprising:
    selecting the stored video file for distribution via one or more communication networks; and
    providing, using a communication interface on one or more web server systems distinct from the video management server system, the stored video file for display within a plurality of displayed instances of graphical user interfaces that include display elements hosted on the one or more web server systems.

3. The method of claim 2 further comprising receiving, at the video management server system, information associated with user accounts for the plurality of displayed instances of graphical user interfaces that include display elements hosted on the one or more web server systems.

4. The method of claim 2 further comprising tracking a quantity of requests to access the video file through the one or more web server systems.

5. The method of claim 4 further comprising using the tracked quantity of requests to access the video file to select the video file for inclusion on a different plurality of displayed instances of graphical user interfaces that include display elements hosted on the one or more web server systems.

6. The method of claim 2 further comprising:
    monitoring user ratings of the video file using the media player software; and
    using the user ratings of the video file in selecting the video file for inclusion on a different plurality of displayed instances of graphical user interfaces that include display elements hosted on the one or more web server systems.

7. The method of claim 1 further comprising receiving, at the video management server system, information associated with a user account for the displayed instance of the first video recorder interface.

8. The method of claim 1 further comprising selecting a video from a plurality of videos received through the media recorder software on the video management server system for inclusion in a television program.

9. The method of claim 1 wherein the video stream is received at the video management server system as the video is captured.

10. The method of claim 1 further comprising:
    selecting the stored video file for distribution via one or more communication networks;
    monitoring viewer response to the video file;
    using the viewer response in selecting the video file for inclusion on a web-based content delivery package; and
    providing, in response to the selection of the video file for inclusion on the web-based content delivery package, the stored video file for display within a plurality of displayed instances of the web-based content delivery package.

11. The method of claim 1 further comprising transcoding the stored video file into at least one format different from the format of the stored video file.

12. The method of claim 1 further comprising providing access to video contained in the stored video file through a social networking system.

13. A non-transitory computer storage medium encoded with a computer program, the program comprising instructions that when executed by data processing apparatus cause the data processing apparatus to perform operations including:
- providing access, through an application programming interface, to capture software stored on a user-generated content management server system, wherein the software is adapted to capture user-generated content using controls including within a window displayed in a first user interface provided by an application on a mobile user device;
- receiving a request to invoke the capture software within a window included in a displayed instance of the first user interface;
- providing a content capture graphical user interface for display on the first user interface, wherein the content capture graphical user interface is provided in response to the request to invoke the capture software, and wherein the content capture graphical user interface is adapted to allow a user to provide user-generated content to the user-generated content management server system as the user-generated content is captured using the capture software;
  - receiving user-generated content for use by the user-generated content management server system, wherein the user-generated content defines user-generated content captured using the content capture graphical user interface; and
- wherein the user-generated content management server system is adapted to:
- generate a user-generated content file using the received user-generated content; and
- store the user-generated content file on the user-generated content management server system.

14. The non-transitory computer storage medium of claim 13 with the program further comprising instructions that when executed by data processing apparatus cause the data processing apparatus to perform operations including:
- providing the stored user-generated content file for display within a plurality of displayed instances of graphical user interfaces that include display elements hosted on one or more web server systems distinct from the user-generated content management server system.

15. The non-transitory computer storage medium of claim 14 with the program further comprising instructions that when executed by data processing apparatus cause the data processing apparatus to perform operations including receiving information associated with user accounts for a plurality of displayed instances of one or more webpages hosted on the one or more web server systems.

16. The non-transitory computer storage medium of claim 14 with the program further comprising instructions that when executed by data processing apparatus cause the data processing apparatus to perform operations including:
- monitoring viewer response to the user-generated content file;
- using the viewer response in selecting the user-generated content file for inclusion on a different plurality of displayed instances of graphical user interfaces that include display elements hosted on a web server system distinct from the user-generated content management server system; and
- providing, in response to the selection of the user-generated content file for inclusion on the different plurality of displayed instances of graphical user interfaces, the stored user-generated content file for display within a plurality of displayed instances of the additional webpage.

17. The non-transitory computer storage medium of claim 14 with the program further comprising instructions that when executed by data processing apparatus cause the data processing apparatus to perform operations including monitoring viewer response to the user-generated content file; and using the viewer response in selecting user-generated content defined in the user-generated content file for inclusion in a linear television program.

18. The non-transitory computer storage medium of claim 13 with the program further comprising instructions that when executed by data processing apparatus cause the data processing apparatus to perform operations including receiving, at the user-generated content management server system, information associated with a user account for the displayed instance of the first user interface.

19. The non-transitory computer storage medium of claim 13 with the program further comprising instructions that when executed by data processing apparatus cause the data processing apparatus to perform operations including selecting a user-generated content file from a plurality of user-generated content files received through the capture software on the user-generated content management server system for inclusion in a television program.

20. A system comprising:
- one or more user content management servers operable to interact with a plurality of mobile user devices and to:
  - provide support to a content capture user interface within displayed instances of a first graphical user interface in response to a user selection of a request to access a graphical user interface, wherein the content capture user interface is provided within a window displayed in the first graphical user interface and the content capture user interface is adapted to allow users to provide user submissions to the one or more content management servers using controls included within the window that includes the content capture user interface, and the user submissions are captured using a content capture software application executing on a respective mobile user device;
  - receive a plurality of user submissions, wherein each user submission defines content captured through the content capture user interface on a respective displayed instance of the first graphical user interface, each user submission is received as the content is captured and each user submission is captured using the content management software executing on the respective mobile user device;
  - generate a plurality of user submission content files based on the received user submissions; and
  - store the user submission content files on one or more user content management servers.

21. The system of claim 20 wherein the user submissions comprise user-generated video content and the user-generated video content is received by the one or more user content management servers as the content is captured through the content capture user interface.

22. The system of claim 21 wherein the one or more user content management servers are further operable to transmit content from a selected user submission content file received through the content capture user interface for inclusion in a linear television program.

23. The system of claim 20 wherein the one or more user content management servers are further operable to:
- provide a selected stored user submission content file for display within a plurality of displayed instances of graphical user interfaces that include display elements hosted on one or more web server systems;

monitor viewer response to the selected user submission content file;
use the viewer response in selecting the user submission content file for inclusion on a different plurality of displayed instances of graphical user interfaces that include display elements hosted on one or more web server systems; and
provide, in response to the selection of the user submission content file for inclusion on the different plurality of displayed instances of graphical user interfaces, the stored user submission content file for display within a plurality of displayed instances of the additional webpage.

24. The system of claim 20 wherein the first graphical user interface comprises a first webpage.

25. The system of claim 20 wherein the one or more user content management servers are further operable to:
select the stored video file for distribution via one or more communication networks; and
provide, using a communication interface on one or more web server systems distinct from the one or more user content management servers, the stored video file for display within a plurality of displayed instances of graphical user interfaces that include display elements hosted on the one or more web server systems.

26. The system of claim 25 wherein the one or more user content management servers are further operable to receive information associated with user accounts for the plurality of displayed instances of graphical user interfaces that include display elements hosted on the one or more web server systems.

27. The system of claim 25 wherein the one or more user content management servers are further operable to:
monitor viewer response to the video file through the plurality of displayed instances of graphical user interfaces;
use the viewer response in selecting the video file for inclusion on an additional plurality of displayed instances of graphical user interfaces that include display elements hosted on one or more web server systems; and
provide, in response to the selection of the video file for inclusion on the additional plurality of displayed instances of graphical user interfaces, the stored video file for display within the additional plurality of displayed instances of graphical user interfaces.

28. The system of claim 25 wherein the one or more user content management servers are further operable to:
monitor viewer response to the video file on the through the plurality of displayed instances of graphical user interfaces; and
use the viewer response in selecting video defined in the video file for inclusion in a linear television program.

29. The system of claim 20 wherein the one or more user content management servers are further operable to receive information associated with a user account for the displayed instance of the first graphical user interface.

30. The system of claim 20 wherein the one or more user content management servers are further operable to transcode the stored video file into at least one format different from the format of the stored video file.

31. A non-transitory computer storage medium encoded with a computer program, the program comprising instructions that when executed by data processing apparatus cause the data processing apparatus to perform operations including:

receiving a request to invoke media recorder software within a displayed instance of a video recorder interface on a mobile device, wherein the video recorder interface is implemented using an application on the mobile device;
establishing a connection between the mobile device and media recorder management software stored on a video management server system;
providing, using the media recorder software, a video recorder interface in response to the request, wherein the video recorder interface is adapted to allow a user to record video from within the displayed instance of the video recorder interface to the video management server system as the video is captured using the media recorder software executing on the mobile device; and
providing a video stream to the video management server system, wherein the video stream defines video captured using controls included in the video recorder interface and wherein the video stream is captured using the media recorder software executing on the mobile device and the provided video stream is adapted to allow generation of a video file to be stored on the video management server system.

32. The computer storage medium of claim 31 wherein the program further comprising instructions that when executed by data processing apparatus cause the data processing apparatus to perform operations including providing access to editing tools through the application on the mobile device, wherein the editing tools allow a user to edit the stored video file.

33. The computer storage medium of claim 31 wherein the video stream is provided to the video management server system as the video is captured.

34. A system comprising:
one or more user content management servers operable to interact with a plurality of mobile user devices and to:
receive a request to invoke media recorder software within a displayed instance of a video recorder interface on a mobile device, wherein the video recorder interface is implemented using an application on the mobile device;
establish a connection between the mobile device and media recorder management software stored on a video management server system;
provide, using the media recorder software, a video recorder interface in response to the request, wherein the video recorder interface is adapted to allow a user to record video from within the displayed instance of the video recorder interface to the video management server system as the video is captured using the media recorder software executing on the mobile device; and
provide a video stream to the video management server system, wherein the video stream defines video captured using controls included in the video recorder interface and wherein the video stream is captured using the media recorder software executing on the mobile device and the provided video stream is adapted to allow generation of a video file to be stored on the video management server system.

35. The system of claim 34 wherein the one or more user content management servers are further operable to:
select the stored user-generated content file for distribution via one or more communication networks; and
provide the stored user-generated content file for display within a plurality of displayed instances of graphical user interfaces that include display elements hosted on one or more web server systems distinct from the one or more user content management servers.

36. The system of claim 35 wherein the one or more user content management servers are further operable to receive information associated with user accounts for a plurality of displayed instances of one or more webpages hosted on the one or more web server systems.

37. The system of claim 35 wherein the one or more user content management servers are further operable to:
monitor viewer response to the user-generated content file;
use the viewer response in selecting the user-generated content file for inclusion on an additional plurality of instances of graphical user interfaces that include display elements hosted on a web server system distinct from the one or more user content management servers; and
provide, in response to the selection of the user-generated content file for inclusion on the additional plurality of instances of graphical user interfaces, the stored user-generated content file for display within the additional plurality of displayed instances of the graphical user interfaces.

38. The system of claim 35 wherein the one or more user content management servers are further operable to:
monitor viewer response to the user-generated content file; and
use the viewer response in selecting user-generated content defined in the user-generated content file for inclusion in a linear television program.

\* \* \* \* \*